(12) United States Patent
Yamaguchi

(10) Patent No.: US 6,665,434 B1
(45) Date of Patent: Dec. 16, 2003

(54) DEVICE, METHOD, AND RECORDIUM FOR CORRECTING COLOR IMBALANCE OF AN IMAGE

(75) Inventor: Hiroshi Yamaguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/518,265

(22) Filed: Mar. 3, 2000

(30) Foreign Application Priority Data

Mar. 11, 1999 (JP) .......................................... 11-064962

(51) Int. Cl.⁷ ............................ G06K 9/00; G06K 9/40; G03F 3/08
(52) U.S. Cl. ..................... 382/162; 382/167; 382/275; 358/518
(58) Field of Search ................................ 382/162, 167, 382/163, 275; 358/1.9, 509, 518, 520, 521, 527, 531; 355/38, 40; 348/223.1; 399/1

(56) References Cited

U.S. PATENT DOCUMENTS

| 5,206,686 A | * | 4/1993 | Fukui et al. ..................... 399/1 |
| 5,644,647 A | * | 7/1997 | Cosgrove et al. ........... 382/162 |
| 5,719,661 A | * | 2/1998 | Terashita ..................... 355/38 |
| 5,748,287 A | * | 5/1998 | Takahashi et al. ............. 355/40 |
| 5,781,315 A |   | 7/1998 | Yamaguchi |
| 6,243,133 B1 | * | 6/2001 | Spaulding et al. ........ 348/223.1 |
| 6,462,835 B1 | * | 10/2002 | Loushin et al. .............. 358/1.9 |

FOREIGN PATENT DOCUMENTS

JP          A983825        3/1997

* cited by examiner

Primary Examiner—Andrew W. Johns
Assistant Examiner—Amir Alavi
(74) Attorney, Agent, or Firm—Birch, Stewart, Kolasch & Birch, LLP

(57) ABSTRACT

An image processing device corrects for color imbalances in an image caused by a bias in the light source at the time the image is recorded and/or a bias that exists due to the characteristics of the underlying image recording medium. The device employs a method in which the following are determined: a color of a highlight portion in an image; a correlation between the color of highlight portion and the color of each element forming the image; and an extent of bias in the color balance of the image caused by the light source. The device also corrects the color balance of the image based on the determinations. In addition, the device may also estimate grey balance of an image based on data from a plurality of images recorded under substantially uniform conditions. The device may correct the color balance based on the estimated grey balance.

20 Claims, 14 Drawing Sheets

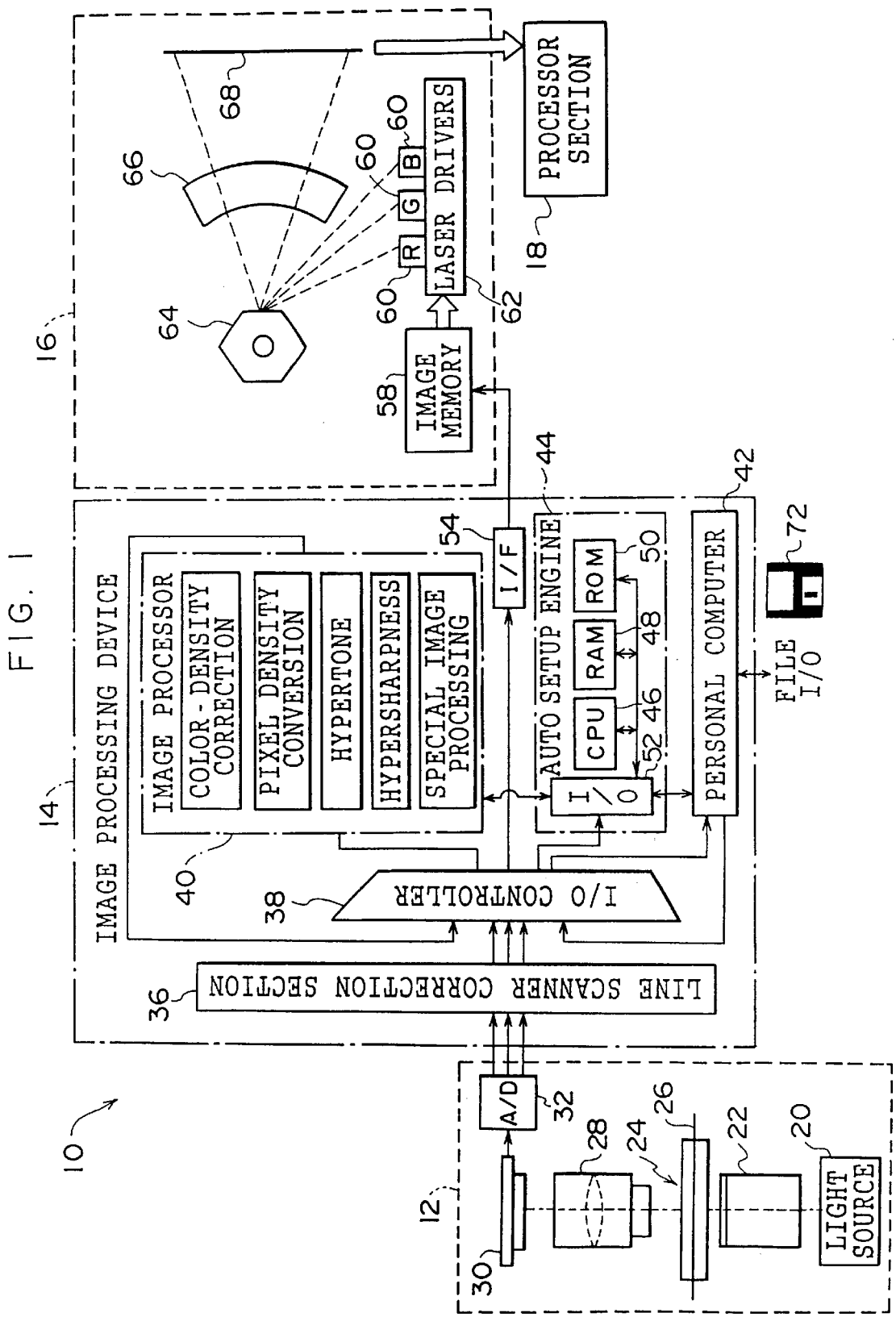

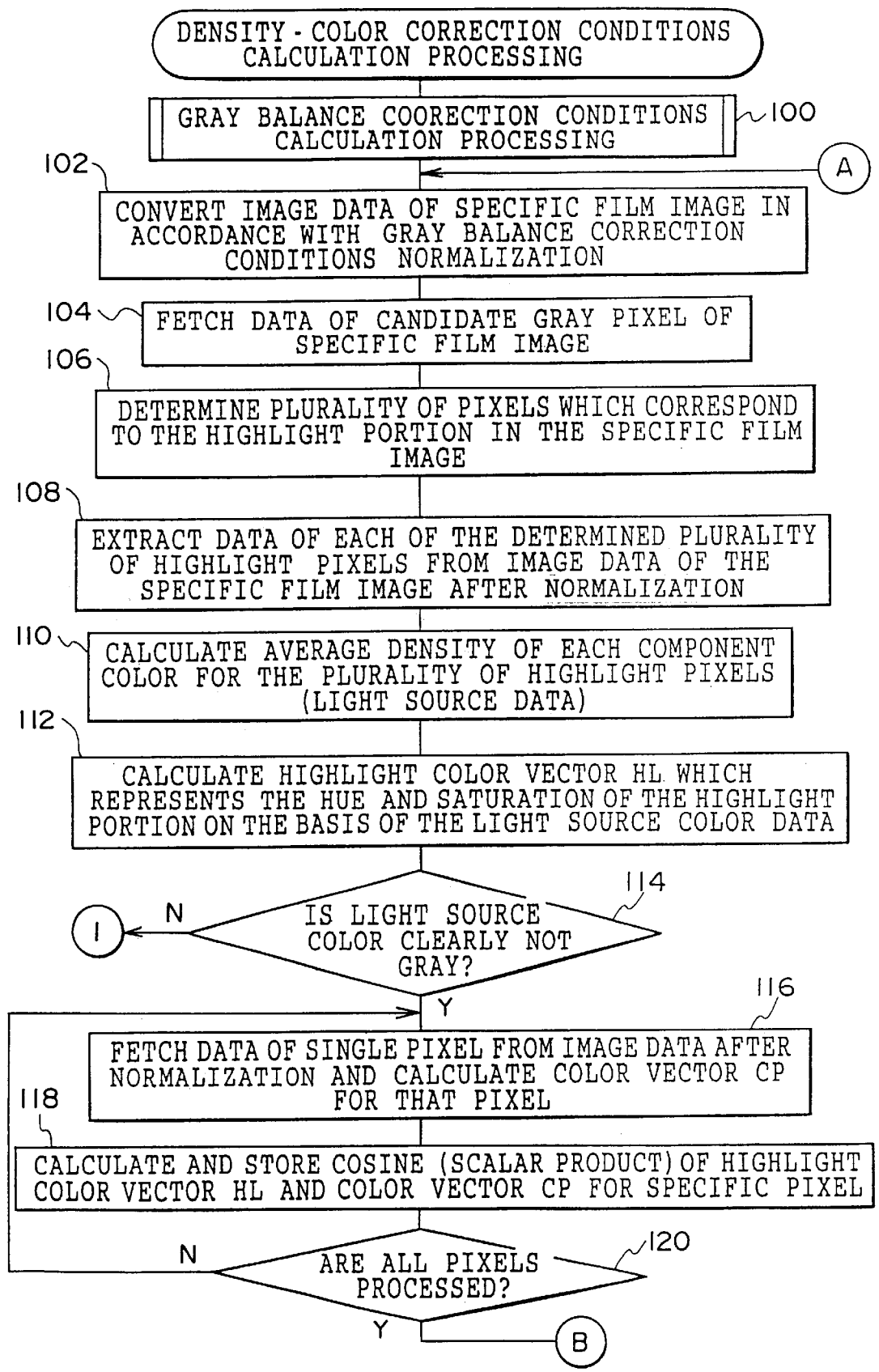

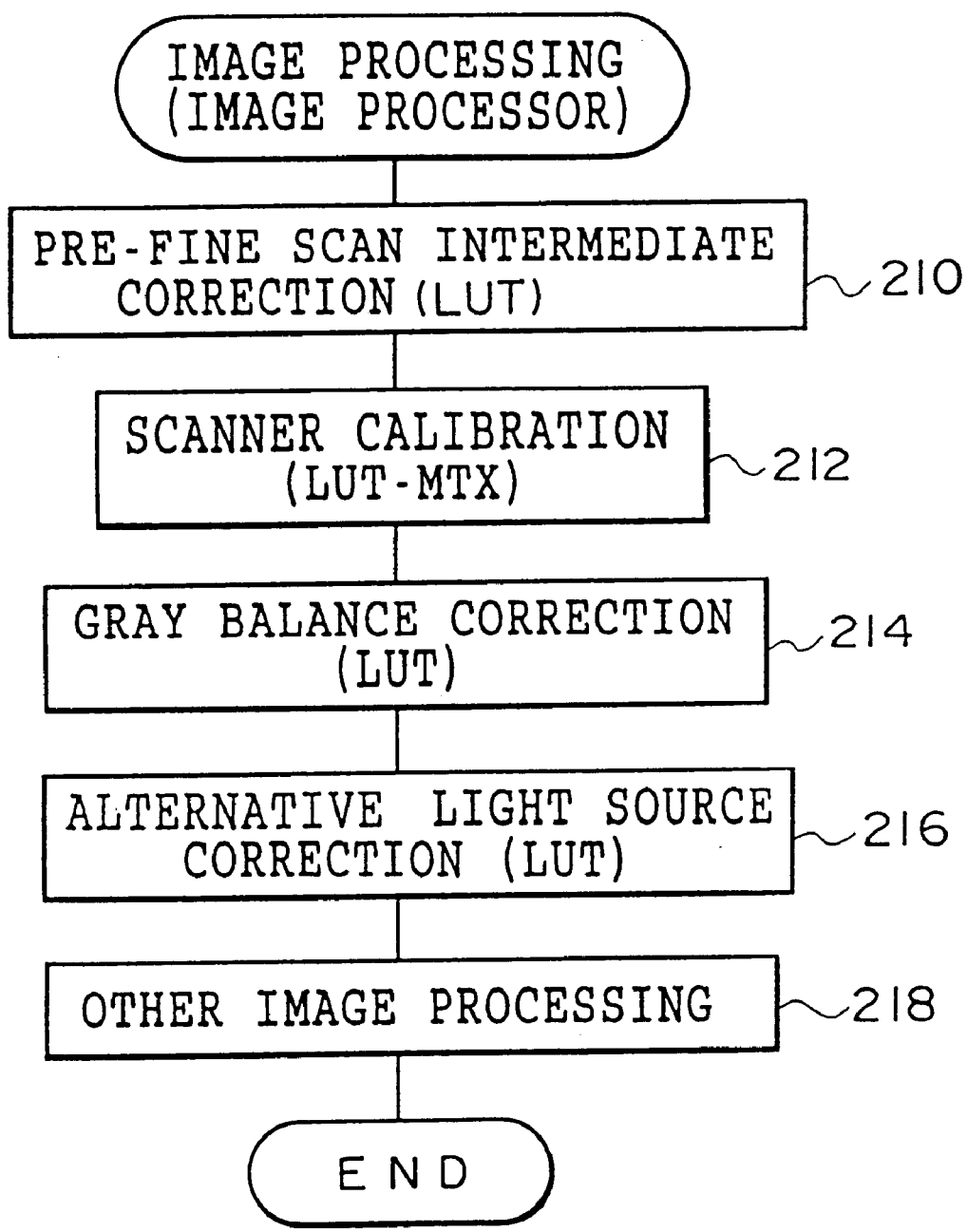

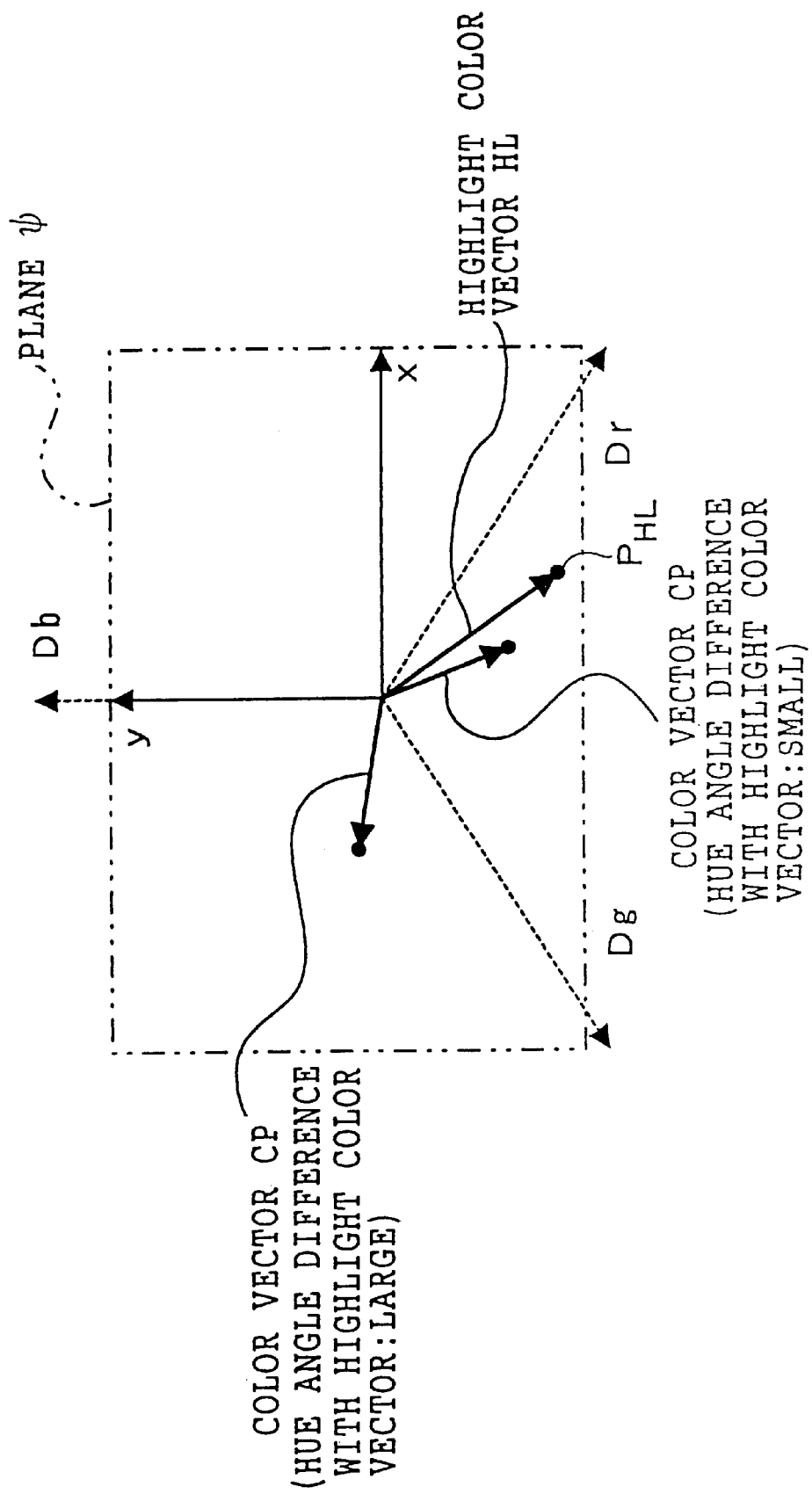

DEVICE, METHOD, AND RECORDIUM FOR CORRECTING COLOR IMBALANCE OF AN IMAGE

BACKGROUND OF THE INVENTION

1. Field of the Invention

The present invention relates to an image processing device, an image processing method, and a recording medium, and particularly to an image recording method for correcting, in image data representing an original image formed by recording an object by photography, at least the color imbalance of the original image caused by the light source when the object was recorded by photography, an image processing device which can make appropriate use of the image processing method, and a recording medium for recording a program which enables a computer to function as the image processing device.

2. Description of the Related Art

The color balance of an image visualized on a photographic film by performing developing processing and the like on the photographic film on which an object has been recorded by photography with a camera or the like (i.e. of an image recorded by photography on photographic film), is affected by the characteristics of the photographic film itself and by the processing conditions during the image processing (these will collectively be referred to below as "film characteristics"), and the color balance may become biased compared to the color balance of the object when photographed. For this reason, when an image recorded by photography on a photographic film is recorded on a recording material such as photographic paper or is displayed on a display means such as a display unit, it is sometimes necessary to correct the color balance of the image recorded on the recording material or displayed on the display means (referred to below as the "output image"), so that the color balance of the output image matches the color balance of the object when photographed (i.e. so that the gray portions of the object at the time of photography are reproduced as gray on the output image).

A known example of a method for correcting the color balance of an output image is one in which, assuming that the color of the pixel corresponding to the highlight (for example, the pixel having the maximum density in a negative image, and the pixel having the minimum density in a positive image) of an image recorded by photography on a photographic film (an original image), and the color of the pixel corresponding to the shadow (for example, the pixel having the minimum density in a negative image, and the pixel having the maximum density in a positive image) of the original image are taken as white and black respectively, the gray balance, which represents the color balance on an original image of the gray portions of the photographed object at the time of photography, is estimated and the color balance of the output image is then corrected using the estimated gray balance as a reference. In this method, the pixel corresponding to the highlight and the pixel corresponding to the shadow are each extracted from the original image, and an axis joining in a straight line the points corresponding to both pixels using, for example, RGB density coordinates is determined as the gray axis representing the gray balance.

However, in the above correction method, when the color of the pixel corresponding to the highlight in an original image is not white, such as when the highlight is the forehead of the face of, for example, a Japanese person in an image in which an electronic flash has been used to photograph the person, it is not possible to determine the gray axis representing the proper gray balance (likewise with the shadow), and the color balance of the output image is biased towards the color which complements the color of the pixel corresponding to the highlight. This is known as "highlight failure". The problem has thus been that while the appearance frequency of original images in which this type of highlight failure occurs easily is relatively high, so that likelihood of obtaining an output image with the proper color balance is low.

Another method is known in which, on the basis of Evan's theory, an image having a uniform LATD (Light Accumulation Transmission Density) for each component color (e.g. RGB), is regarded as being an image in which the color balance matches the color balance of the photographed object at the time of photography (an image in which the gray balance can be determined), the LATD (Light Accumulation Transmission Density) for each component color (e.g. RGB) of the original image is then measured, and the color balance of the output image is corrected so that the LATD for each component color of the output image is uniform.

However, in the above correction method, when regions which are non-gray and in which the hue is substantially uniform (for example, regions corresponding to a green lawn or a blue sky or sea) occupy relatively large portion of the original image, then correcting the LATD so that the LATD is uniform for each component color of the output image results in the color balance of the output image becoming biased towards the color which complements the color of the above regions This is known as color failure. Because the appearance frequency of original images in which this type of color failure occurs easily is relatively high, the problem has been that likelihood of obtaining an output image with the proper color balance is low, as is the case with the method described above.

Japanese Patent Application Laid-Open (JP-A) No. 9-83825 discloses a method in which image data DR', DG', and DB' relating to low saturation pixels is acquired from image data DR, DG, and DB representing an original image, the shadow points DRs, DGs, and DBs and the highlight points DRh, DGh, and DBh are determined for the respective image data DR', DG', and DB', the image data set (DR", DG") is obtained by, for each same values of one of a pair of the image data (DR', DG') corresponding to each other for each pixel, averaging the values of the other one of the pair (DR', DG') corresponding to the same values, the relationship between the density of the two colors is obtained from the set of the image data (DR", DG") and the shadow points (DRs, DGs) and highlight points (DRh, DGh), and, on the basis of the relationship thus obtained, at least one of the image data DR and image data DG undergoes linear conversion across the entire area thereof so as to be made equal with the other one of DR and DG.

In the technology described in the above publication, an attempt is made to alleviate the effects brought about when the image is one in which color failure easily occurs by removing from the data to be calculated the data of high saturation pixels from among the image data representing the original image. In addition to the high saturation pixels, pixels which are adjacent to the high saturation pixels and whose hue is different to the high saturation pixels by a predetermined amount or less are also removed from the data to be calculated. However, even if the above processing is actually carried out on an original image in which color failure is likely to occur, many pixels out of those non-gray and substantially uniformly-hued pixels which occupy a relatively large surface portion of the original image are not removed from the data to be calculated and are left remaining. Accordingly, when the original image is one in which color failure is likely to occur, there has been a problem that the color balance of the output image has not been corrected with sufficient accuracy.

Moreover, it is well-known that the color balance of images obtained by photographing and recording on photographic film scenes which are lit by different types of light sources such as fluorescent lights or tungsten lights (alternative light source scene images) is greatly affected by the fact that the spectral distribution of illuminating light from the alternative light sources is hugely different from the spectral distribution of typical light sources such as daylight and the like, and the color balance becomes biased towards a particular color relative to the original color balance (the color balance when illumination is from a typical light source such as daylight) of the photographed object. The color of the pixels corresponding to the highlight in an alternative light source original scene image is a color other than white (the particular color depends on the type of light source), in the same way as in the above described images prone to highlight failure.

However, in order to obtain an output image with the proper color balance (an output image in which the subject of the photograph is reproduced in the original color balance) from an alternative light source scene image, it is necessary to correct the color balance while regarding the color of the pixel corresponding to the highlight as white (gray). In contrast, in order to obtain an output image with the proper color balance from an image in which highlight failure is liable to occur, it is necessary to correct the color balance in such a way that the color of the pixel corresponding to the highlight is preserved (while regarding the color of the pixel corresponding to the highlight as non-gray). As can thus be understood, the course for properly correcting the color balance is completely different for each case.

In conventional color balance correction, no consideration whatever is given to the above. Accordingly, color balance correction which satisfies both the requirement for accurate correction of color balance bias of an original image caused by the film characteristics regardless of the content of the original image (i.e. of whether color failure is likely to occur in the image, or whether highlight failure is likely to occur in the image), and the requirement for accurate correction of color balance bias of an original image caused by the light source when the photograph was taken has not yet been seen.

Furthermore, the problems encountered in the above conventional color balance correction are common to the problems encountered when correcting the color balance of an original image obtained recording an object by photography using a digital still camera (an original image recorded as image data on an information recording medium by photographing an object). Namely, the color balance of an original image represented by image data recorded on an information recording medium by photographing an object using a digital still camera is not only affected by the characteristics of the photoelectric conversion element of the digital camera so as to become biased relative to the color balance of the object at the time of photography, but is also affected by the light source at the time of photography so as to become biased relative to the original color balance of the object of the photograph.

SUMMARY OF THE INVENTION

The present invention has been achieved in consideration of the above and a first object thereof is to provide an image processing device capable of accurately correcting bias in the color balance of an original image caused by the light source at a time when an object was recorded by photography.

A second object of the present invention is to provide an image processing device, an image processing method, and a recording medium capable of accurately correcting both bias in the color balance of an original image formed by recording an object by photography caused by the characteristics of the photographing and recording, and bias in the color balance of an original image formed by recording an object by photography caused by the light source at the time of the photographing and recording.

In order to achieve the first object, the image processing device according to a first aspect of the present invention comprises: calculating means for determining the color of a highlight portion in an original image, and the correlation between the color of a highlight portion in the original image and the color of each element forming the original image, based on image data representing the original image formed by photographing and recording an object; determining means for determining the degree or extent of bias in the color balance of an original image caused by the light source at the time the object was recorded by photography, based on the color of the highlight portion in the original image, and the correlation between the color of the highlight portion in the original image and the color of each element forming the original image determined by the calculating means; and correcting means for correcting the color balance of image data in accordance with the color of the highlight portion, based on the degree of bias in the color balance of an original image caused by the light source which degree is determined by the determining means.

The color balance of an original image formed recording an object by photography (i.e. an image visualized on a photographic film by performing developing processing and the like on a photographic film on which an object has been recorded by photography using a camera - in short, an image recorded by photography on a photographic film, alternatively, an image represented by image data recorded on an information recording medium by photographing an object using a digital still camera - in short, an image recorded by photography using a digital still camera) is biased because of the effects of the light source when an alternative light source is used when an object is recorded by photography. However, the present inventors have realized that, depending on the type of light source, the color of the highlight portion in the original image at this time changes to a color of a particular hue and a high level of color saturation and also that the color of non-highlight portions of an original image change to a color tinged with the above particular hue. Accordingly, the present inventors have achieved the first aspect of the present invention.

On the basis of the above, the calculating means according to the first aspect determines the color of the highlight portion in the original image and also the correlation between the color of the highlight portion in the original image and the color of each element forming the original image (a single pixel may be used or a pixel group comprising a plurality of pixels may be used), on the basis of image data representing an original image (i.e. image data obtained by reading an image recorded by photography on a photographic film, or alternatively, image data recorded on an information recording medium using a digital still camera—in short, image data representing an image recorded by photography). Note here that the correlation determined may be only that for the elements corresponding to the non-highlight portions of an original image, or may be that for all of the elements corresponding to the entire area of the original image. The determining means then determines the extent of bias in the color balance of an original image caused by the light source when the object has been recorded by photography, on the basis of the color of the highlight portion in the original image and the correlation between the color of the highlight portion in the original image and the color of each element forming the original image.

Note that, as the extent of the bias in the color balance, the determining means may determine the existence or non-existence of bias in the color balance of the original image caused by the light source at the time when an object has been recorded by photography or instead may determine the amount (the degree) of the bias in the color balance. Moreover, specifically, the determination of the extent of bias in the color balance by the determining means may be a determination of the amount (degree) of the bias in the color balance made from, for example, the two parameters of: (a) the color (e.g. the saturation) of the highlight portion in an original image; and (b) the correlation between the color of the highlight portion in an original image and the color (e.g. the hue) of each element forming the original image. Alternatively, the determination by the determining means may entail determining the existence or non-existence of bias in the color balance of an original image caused by the light source when an object has been recorded by photography, on the basis of the color of the highlight portion in the image (specifically, the degree of bias in the hue of the highlight portion for the gray balance, for example), then, for the original image in which the existence of bias in the color balance caused by the light source has been determined, determining the amount of the bias in the color balance of the original image caused by the light source, on the basis of the correlation between the color of the highlight portion in the original image and the color (e.g. the hue) of each element forming the original image.

By using the color of the highlight portion of the original image as well as the correlation between the color of the highlight portion of the original image and the color of each element forming the original image, as described above, the determining means is able to precisely determine the extent or degree of (bias in the color balance of the original image caused by the light source when the object has been recorded by photography. Further, because the correcting means corrects the color balance of the image data to accord with the color of the highlight portion in an original image on the basis of the degree of bias in the color balance caused by the light source, which extent has been determined by the determining means, the bias in the color balance of an original image caused by the light source during photographing and recording can be corrected with a great deal of accuracy.

In order to achieve the second object, the image processing device according to the second aspect of the present invention comprises: normalizing means for estimating the gray balance in an original image to be processed, based on image data of a plurality of original images in which objects have been recorded by photography under uniform conditions, and normalizing the image data of the original image to be processed using the estimated gray balance as a reference; calculating means for determining the color of a highlight portion in the original image to be processed, and the correlation between the color of a highlight portion in the original image to be processed and the color of each element forming the original image to be processed, based on image data of the original image to be processed; determining means for determining the degree of the bias in the color balance of the original image to be processed caused by the light source at the time of photographing and recording the object, based on the color of the highlight portion in the original image to be processed, as well as the correlation between the color of the highlight portion in the original image to be processed and the color of each element forming the original image, which have been determined by the calculating means; and correcting means for correcting the color balance of the image data of the original image to be processed in accordance with the color of the highlight portion, based on the degree of the bias in the color balance caused by the light source, which extent was determined by the determining means.

The normalizing means according to the second aspect estimates the gray balance in an original image to be processed, on the basis of image data from a plurality of original images in which objects have been recorded by photography under uniform conditions (for example, objects photographed with a camera and recorded on the same photographic film, or objects whose image data is recorded with a digital still camera on the same information recording medium, or objects whose image data is recorded by photography with the same digital still camera), and normalizing the image data of the original image to be processed using the estimated gray balance as a reference. By using the image data from a plurality of original images as described above, then, for example, even if the original images to be processed or a portion of the original images from the plurality of original images to be processed are images in which color failure is liable to occur, or in which highlight failure is liable to occur, unevenness in the image content of each original image is averaged out over the entire plurality of original images and the photographic and recording characteristics for the plurality of original images can be accurately estimated.

Note that, in the present invention, the term "photographic and recording characteristics" means the characteristics representing the relationship between the density (or luminance) for each component color in the object and the density of each color component in the image data, and represents the gray balance which varies in accordance with this relationship. These photographic and recording characteristics are defined in accordance with the characteristics of the film when an image is photographed with a camera and recorded on photographic film, the characteristics of the photoelectric conversion element when image data is recorded on an information recording medium by a digital still camera, and the like.

Because a plurality of original images have been recorded by photography under uniform conditions, the photographic and recording characteristics are the same or similar, and by using image data from the plurality of original images, it is possible to accurately estimate the gray balance in the original image to be processed which is biased in accordance with the photographic and recording characteristics. Moreover, by normalizing the image data of the original image to be processed using the estimated gray balance as a reference, it is possible to accurately correct the bias in the color balance (gray balance) of the original image to be processed caused by the photographic and recording characteristics.

Note that, specifically, the normalizing of the image data of the original image to be processed by the normalizing means preferably entails, for example, extracting each candidate gray pixel which has a high likelihood of being a pixel corresponding to a gray portion of the object from each original image, on the basis of image data of the plurality of original images, and then performing the normalization on the basis of the distribution over predetermined coordinates of the group of candidate gray pixels formed from the candidate gray pixels extracted from each original image. Because, in the above, the group of candidate gray pixels is formed from candidate gray pixels extracted from a plurality of original images, the distribution of the group of candidate gray pixels over predetermined coordinates accurately represents the photographic and recording characteristics for the plurality of original images. Moreover, by using this distribution, it is possible to accurately estimate the gray balance in the original image to be processed, and to accurately correct the bias in the color balance of the original image to be processed caused by the photographic and recording characteristics.

Further, specifically, the extraction of the candidate gray pixels from each original image entails, for example, determining high saturation pixels in the original images using the colors of the highlight and shadow in each original image as a reference, and then performing the extraction by removing the high saturation pixels thus determined. Moreover, it is also possible to determine that pixels, from those pixels located adjacent to high saturation pixels in the image, whose hue (or hue and saturation) is similar to the high saturation pixels are also high saturation pixels. Accordingly, it is possible to remove as high saturation pixels almost all pixels estimated to become the cause of color failure.

Moreover, the normalization of the image data of the original image to be processed based on the distribution over predetermined coordinates of the group of candidate gray pixels is preferably performed by performing a linear approximation on the distribution within the density range of the original image to be processed from out of the distribution over predetermined coordinates of the group of candidate gray pixels, estimating the gray axis representing the gray balance, and normalizing the image data of the original image to be processed using the estimated gray axis as a reference.

Because the density range of each original image is unfixed, the density range taken for all of the plurality of original images is generally spread over a wide density range, and, together with this, the photographic and recording characteristics for the plurality of original images are also spread over a wide density range. Moreover, because the photographic and recording characteristics are determined in accordance with the film characteristics or the photoelectric conversion element characteristics or the like, the photographic and recording characteristics are nonlinear. On the other hand, the density range of each original image is clearly smaller than the density range of the photographic and recording characteristics, and the photographic and recording characteristics (gray balance information) which are necessary for each original image when normalization using the normalizing means is carried out (correction of the gray balance) are no more than the density range a portion of the entire density range of the photographic and recording characteristics (the density range of each original image).

Accordingly, as stated above, by performing a linear approximation on the distribution within the density range of the original image to be processed from out of the distribution over predetermined coordinates of the group of candidate gray pixels, and by then estimating the gray axis representing the gray balance in the original image to be processed, the gray balance (gray axis) in the density range necessary for the normalization (gray balance correction) of the original image to be processed can be simply and accurately estimated.

Note, however, that although the bias in the color balance of the original image to be processed caused by the photographic and recording characteristics can be corrected by performing the above normalization process using the normalizing means, because bias in the color balance caused by the light source at the time of photographing and recording is unconnected to the photographic and recording characteristics, then, apart from special cases such as when the entirety of a plurality of images have been recorded by photography using the same alternative light source, even if normalization using the normalizing means is performed on the original image which has been recorded by photography using an alternative light source such as a fluorescent lamp or a tungsten lamp, any bias in the color balance caused by the light source at the time of photographing and recording remains uncorrected.

Because of this, in the second aspect: the calculating means determines, on the basis of the image data of the original image to be processed, the color of the highlight portion in the original image to be processed and the correlation between the color of the highlight portion in the original image to be processed and the color of each element forming the original image to be processed; and the determining means determines, on the basis of the color of the highlight portion in the original image to be processed and the correlation between the color of the highlight portion in the original image to be processed and the color of each element forming the original image to be processed, the bias in the color balance of the original image to be processed caused by the light source at the time an object was recorded by photography. This enables the bias in the color balance of the original image to be processed caused by the light source at the time an object was recorded by photography to be accurately determined, in the same way as in the first aspect of the present invention.

Moreover, because the correcting means corrects the color balance of the image data in accordance with the color of the highlight portion in the original image to be processed on the basis of the bias in the color balance caused by the light source determined by the determining means, the bias in the color balance of the original image caused by the light source at the time of photographing and recording can be accurately corrected. Consequently, according to the second aspect of the present invention, both bias in the color balance caused by the photographic and recording characteristics and bias in the color balance caused by the light source at the time of photographing and recording can be accurately corrected in an original image in which an object has been recorded by photography.

According to a third aspect of the present invention, in the second aspect, the calculating means extracts a highlight portion of the original image to be processed using data of pixels other than high saturation pixels in the original image to be processed determined using the colors of a highlight and shadow of the original image to be processed as references, based on image data before normalization has been performed by the normalizing means, determines the color of the extracted highlight portion, and determines, based on the image data of the original image to be processed after normalization has been performed by the normalizing means, the correlation between the highlight portion in the original image to be processed and the color of each element forming the original image.

When determining the color of the highlight portion in the original image to be processed, it is necessary to remove high saturation pixels which have no connection with the highlight portion in the image being processed before extracting the highlight portion. However, because the color of the highlight portion in an original image recorded by photography using an alternative light source has a specific hue and high saturation color which correspond to the light source, if, for example, high saturation pixels are simply determined and removed using the photographic and recording characteristics for the plurality of original images as a reference, then there is a possibility that the pixels corresponding to the highlight portion in the original image to be processed might also be removed as high saturation pixels.

To counter this, in the third aspect, because the highlight portion in the original image to be processed is extracted and the color of the extracted highlight portion determined using the data of pixels other than the high saturation pixels in the original image to be processed, which data has been determined using the colors of the highlights and shadows of the original image to be processed as references, on the basis of the image data before normalization (i.e. before bias in the color balance caused by the photographic and recording characteristics is corrected on the basis of the image data of the plurality of original images) is performed thereon by the normalizing means, the highlight portion in the original image to be processed can be reliably extracted and the color of the highlight portion accurately detected without the pixels corresponding to the highlight portion being removed as high saturation pixels.

Note here that it is preferable that the image data of the original image to be processed used has already undergone normalization processing by the normalizing means (i.e. the image used has had the bias in the color balance thereof caused by the photographic and recording characteristics corrected) when determining the color of an extracted highlight portion.

Moreover, in the third aspect, because the correlation between the highlight portion in the original image to be processed and the color of each element forming the original image is determined on the basis of the image data of the original image to be processed after normalization has been performed thereon by the normalizing means, namely, is determined on the basis of image data in which bias in the color balance caused by the photographic and recording characteristics has been corrected on the basis of image data of a plurality of original images (in an original image in which an object has been recorded by photography using an alternative light source, the image data represents an image in which the color balance of each portion of an image which includes the highlight portion is biased towards a particular hue after being affected by the light source), the correlation between the color of the highlight portion and the color of each element forming the original image can be accurately determined.

Note that as a fourth aspect of the present invention, all the pixels in the original image to be processed may be used as the elements forming the original image. It is also possible that, out of all of the pixels in the original image to be processed, those candidate gray pixels which have a high likelihood of being pixels corresponding to a gray portion in an object may be used. In particular, when the candidate gray pixels which have a high likelihood of being pixels corresponding to the gray portions of the object are used, then even when pixels affected more by the color of the object than by the color of the light source are present in the original image, the degree of bias in the color balance of the original image to be processed caused by the light source at the time when the object has been recorded by photography can be accurately determined without being affected by the above pixels.

In a fifth aspect of the present invention, the distribution of angles formed by highlight color vectors representing the color of a highlight portion and color vectors representing the color of each element forming an original image may be used as the correlation between the color of the highlight portion and the color of each element forming the original image. In an original image in which an object has been recorded by photography using an alternative light source, the color balance of each portion of the image to be processed which includes a highlight portion is biased towards a specific hue corresponding to the light source used for the photographing and recording. Because of this, the angles formed by highlight color vectors and the color vectors of each element (representing the difference in hue) are small angles for all of the elements. Accordingly, it is possible from the distribution of the angles to accurately determine the degree of color bias in an original image cause by the light source during the photographing and recording of the object.

Note that an example of an angle formed by a highlight color vector and the color vector of each pixel includes the inner product (cosine) of both vectors. Further, an example of a distribution of the angles includes an cumulative histogram of the inner products of the vectors.

In a sixth aspect of the present invention, according to the second aspect of the present invention, the correcting means determines original images formed by photographing and recording similar scenes from the plurality of original images, and corrects the color balance of image data of the original images formed by photographing and recording similar scenes by an identical or similar correction amount.

As stated above, in the sixth aspect, the correcting means determines original images (for example, original images whose highlight portions have substantially the same color presumed to be recorded by photography under the same light source) formed recording by photography similar scenes from a plurality of original images, and corrects the color balance of image data of the original images formed recording by photography similar scenes by an identical or similar correction amount. Therefore, when image data corrected by the correcting means is used as the output of the image (i.e. by recording the image on a recording material, displaying the image on a display means, and the like), the finishing of output images corresponding to original images formed recording by photography similar scenes can be made identical or similar.

A seventh aspect of the present invention is an image processing method comprising the steps of: (a) estimating the gray balance in an original image to be processed based on image data of a plurality of original images formed by photographing and recording an object under uniform conditions, and normalizing image data of the original image to be processed using the estimated gray balance as a reference; (b) obtaining the color of a highlight portion in an original image to be processed, and the correlation between the color of the highlight portion in an original image to be processed and the color of each element forming the original image, based on image data of an original image to be processed; (c) determining a degree of bias in the color balance of the original image to be processed caused by the light source present during the photographing and recording of an object, based on the color of the highlight portion in the original image to be processed, and the correlation between the color of the highlight portion in the original image to be processed and the color of each element forming the original image; and (d) correcting the color balance of image data of the original image to be processed in accordance with the color of the highlight portion, based on the above-determined degree of bias in the color balance caused by the light source. Therefore, in the same way as in the second aspect of the present invention, bias in the color balance caused by the characteristics of the photographing and recording as well as bias in the color balance caused by the light source present during the photographing and recording can both be accurately corrected for original images in which objects have been recorded by photography.

An eighth aspect of the present invention is a recording medium on which is recorded a program for executing by means of a computer a routine including: a first step in which the gray balance in an original image to be processed is estimated based on image data of a plurality of original images formed by photographing and recording an object under uniform conditions, and image data of the original image to be processed is normalized using the estimated gray balance as a reference; a second step in which the color of a highlight portion in an original image to be processed, and the correlation between the color of the highlight portion in the original image to be processed and the color of each element forming the original image is obtained based on image data of the original image to be processed; a third step in which a degree of bias in the color balance of the original image to be processed caused by the light source present during the photographing and recording of the object is determined based on the color of the highlight portion in the original image to be processed, and the correlation between the color of the highlight portion in the original image to be processed and the color of each element forming the original image; and a fourth step in which the color balance of image data of the original image to be processed is corrected in accordance with the color of the highlight portion based on the above-determined degree of bias in the color balance caused by the light source.

As described above, a routine which includes the above first through fourth steps, namely a program enabling a computer to function as the image processing device of the second aspect, is recorded on the recording medium according to an eighth aspect of the present invention. Therefore, when the computer reads and executes the program recorded on the recording medium, in the same way as in the second aspect of the present invention, bias in the color balance caused by the characteristics of the photographing and recording as well as bias in the color balance caused by the light source present during the photographing and recording can both be accurately corrected for original images in which objects have been recorded by photography.

BRIEF DESCRIPTION OF THE DRAWINGS

FIG. 1 is a schematic structural view of an image processing system according to the present embodiment.

FIGS. 2A and 2B are flow charts showing the content of processing for setting density and color conversion conditions according to the present embodiment.

FIG. 4 is a flow chart showing, for convenience, the content of image processing performed by an image processor.

FIGS. 6A and 6B are conceptual views showing examples of the data distribution of each pixel using RGB density coordinates for images containing a large number of high saturation pixels; while

FIG. 7A is a conceptual view showing an example of the distribution of a gray candidate pixel group comprising gray candidate pixels extracted from a plurality of images using RGB density coordinates; while

FIG. 8 is a conceptual view showing an example of a highlight color vector HL and the color vector of a specific pixel CP.

DESCRIPTION OF THE PREFERRED EMBODIMENTS

Figure 2B:
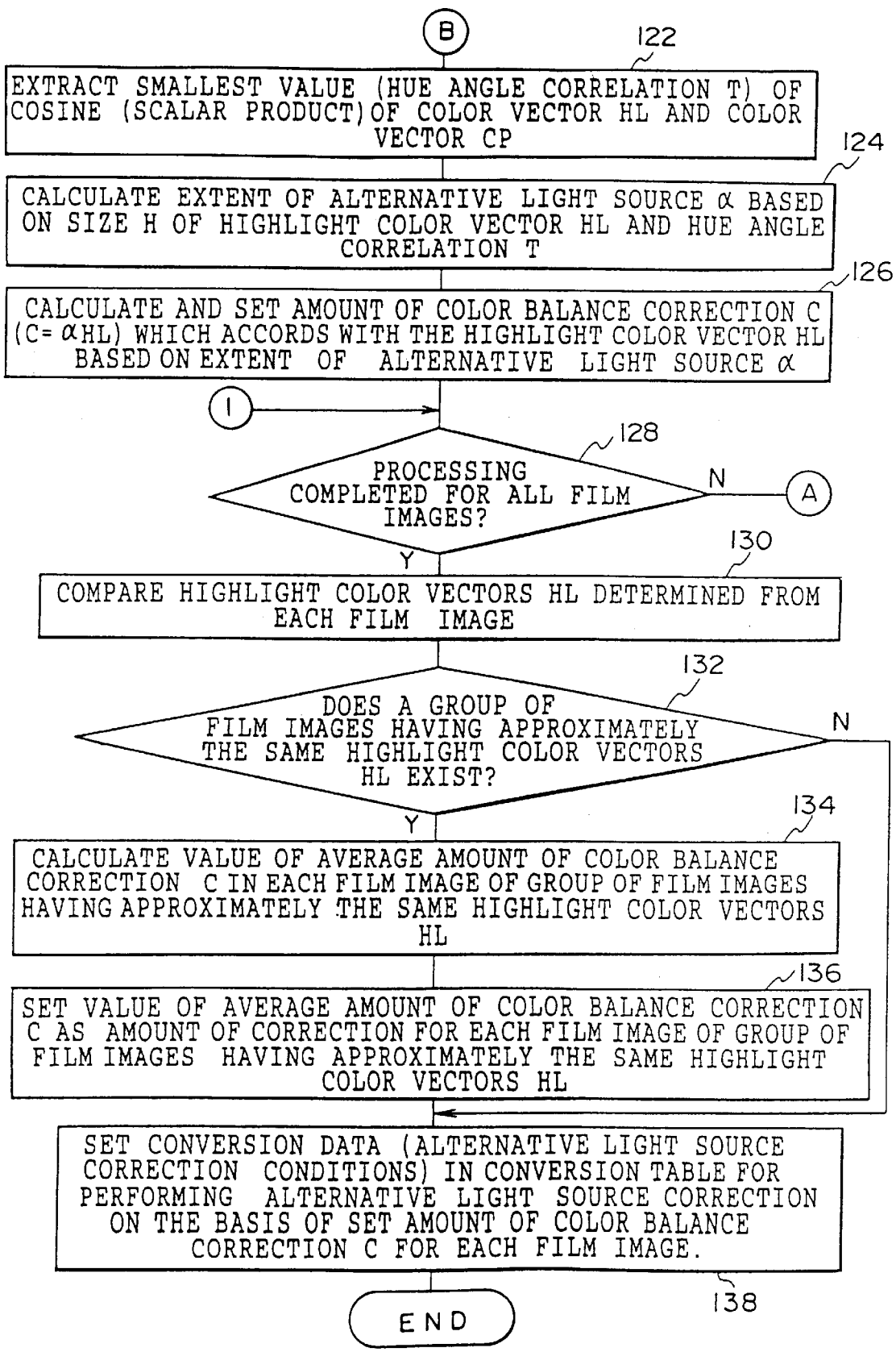

Embodiments of the present invention will be explained below in detail with reference to the figures. FIG. 1 shows an image processing system 10 to which the present invention is applied. The image processing system 10 is configured with a film scanner 12, an image processing apparatus 14, and a printer 16 connected in series.

The film scanner 12 is structured so as to operate in the following manner. The film scanner 12 reads film images (i.e. negative or positive images of a photographed object which are visualized by undergoing developing processing: these correspond to the original images of the present invention) recorded on a photographic photosensitive material such as a photographic film 26, which may be, for example, a negative film or a reversal film, and is referred to below simply as a photographic film. The film scanner 12 then outputs image data obtained from the readings. Light which is emitted from a light source 20 and whose amount of light unevenness thereof has reduced by a diffusion box 22 is irradiated onto the photographic film 26 set in a film carrier 24. The light which passes through the photographic film 26 is focussed on a light receiving surface of a linear CCD sensor 30 (or alternatively, an area CCD sensor) via a lens 28.

The film carrier 24 transports the photographic film 26 so that frames on the photographic film 26 at which film images are recorded are positioned in sequence on the optical axis of light emitted from a light source 20. Accordingly, film images recorded on the photographic film 26 are read in sequence by the CCD sensor 30, and signals corresponding to the film images are output from the CCD sensor 30. The signals output from the CCD sensor 30 are converted into digital image data by an A/D converter 32, and are then input into the image processing apparatus 14.

A line scanner correction section 36 of the image processing apparatus 14 performs the following processes in sequence: darkness correction to reduce the darkness output level of cells for each pixel from the input scan data (i.e. the R, G, B data input from the film scanner 12); density conversion to logarithmically convert the darkness corrected data into data representing density values; shading correction to correct the data after density conversion in accordance with the unevenness in the amount of light irradiated onto the photographic film 26; and defective pixel correction to regenerate data, from among the shading corrected data, of cells which do not output a signal corresponding to the amount of incident light (known as defective pixels) by interpolation from adjacent pixel data. An output terminal of the line scanner correction section 36 is connected to an input terminal of an I/O controller 38, and data which has undergone each of the above processings in the line scanner correction section 36 is input as scan data to the I/O controller 38.

An input terminal of the I/O controller 38 is also connected to a data output terminal of an image processor 40, and image data which has undergone image processing (explained below in detail) is input from the image processor 40. An output terminal of the I/O controller 38 is also connected to a personal computer 42. The personal computer 42 is provided with unillustrated expansion slots. Unillustrated drivers for reading/writing data on an information recording medium such as a memory card or a CD-R, or communication control devices for communicating with other information processing devices are connected to the expansion slots. When file image data is input from the outside via an expansion slot, the input file image data is input to the I/O controller 38.

An output terminal of the I/O controller 38 is connected to each of a data input terminal of the image processor 40, an auto setup engine 44, and the personal computer 42, and is also connected to a printer 16 via an I/F circuit 54. The I/O controller 38 selectively outputs input image data to each of the above devices connected to its output terminals.

In the present embodiment, each film image recorded on the photographic film 26 is read twice at different resolutions by the film scanner 12. In the first reading performed at a relatively low resolution (referred to below as a prescan), even when the film density is extremely low (for example, an underexposed negative image on a negative film), the entire surface of the photographic film 22 is read under reading conditions (e.g. the amount of light in each of the R, G, B wavelength ranges irradiated onto the photographic film 26 and CCD sensor 30 charge accumulation time) which are determined so that accumulated charge saturation does not occur in the CCD sensor 30. The data obtained from this prescan (prescan data) is input to the auto setup engine 44 from the I/O controller 38.

The auto setup engine 44 is provided with a CPU 46, RAM 48 (for example, DRAM), ROM 50 (for example, ROM whose storage contents are rewritable), and an input/output port 52, which are connected to one another via a bus. The auto setup engine 44 determines the frame position of a film image on the basis of the prescan data input from the I/O controller 38, and extracts that data (prescan image data) which corresponds to the area on the photographic film 26 on which the film image is recorded. The auto setup engine 44 also determines the film image size and calculates the amount of image features such as the density on the basis of the prescan image data. The auto setup engine 44 thus determines the reading conditions for the second reading of the prescanned photographic film 26 which the film scanner 12 performs at a relatively high resolution (referred to below as a fine scan). The frame position and reading conditions are then output to the film scanner 12.

The auto setup engine 44 also calculates the amount of image features, including the extraction of the main image portions (for example, facial regions, i.e. those regions corresponding to the face of a person photographed) from within the film image, based on the prescan image data. The auto setup engine also automatically determines by calculation (known as setup calculation) the processing conditions for respective image processing performed on the image data (fine scan image data) obtained from the fine scan operation performed by the film scanner 12. The processing conditions thus determined are output to the image processor 40.

A display unit, a keyboard, and a mouse (none of which are illustrated) are connected to the personal computer 42. The personal computer 42 fetches the prescan image data from the auto setup engine 44 and also fetches the image processing conditions determined by the auto setup engine 44. Based on the fetched processing conditions, the personal computer 42 then generates simulation image data by performing the same image processing on the prescan image data as that performed by the image processor 40 on the fine scan image data.

The simulation image data thus generated is then converted into signal so that the image can be displayed on the display unit, and the simulation image is displayed on the display unit on the basis of the image signal. An operator may then examine the image quality and the like of the displayed simulation image. Information indicating corrections to the processing conditions resulting from the examination can be input via the keyboard and output to the auto setup engine 44. Accordingly, recalculation of the image processing conditions and the like can be performed by the auto setup engine 44.

Meanwhile, image data (fine scan image data), which is input to the I/O controller 38 when the film scanner 12 performs a fine scan on a film image, is input from the I/O controller 38 to the image processor 40. The image processor 40 is provided with various image processing circuits for performing various image processings such as density and color conversion processings including gradation conversion and color conversion, pixel density conversion processing, hypertone processing to compress the gradation of ultra low frequency luminance components in the image, and hypersharpness processing to emphasize sharpness while suppressing graininess. Accordingly, various image processings are performed by the image processor 40 on the input image data according to processing conditions determined and transmitted for each image by the auto setup engine 44 to the image processor 40.

Examples of image processing able to be performed by the image processor 40 in addition to those above include: sharpness correction or soft focus processing on all or a part of an image (for example, the area corresponding to the face of a person photographed); image processing to intentionally alter the tone of an image (for example, image processing to finish the output image in a monotone, image processing to finish the output image in a portrait tone, and image processing to finish the output image in a sepia tone); image processing to trim the image (for example, image processing to make the person present in the original image look more slender in the main image and image processing to correct red eye); and various types of LF aberration correction processings performed on images photographed using a lens-fitted film package (LF) in order to correct reductions in the image quality of an output image caused by characteristics of the LF lens such as distortion aberration of the LF lens, geometric distortion of the image caused by chromatic aberration of magnification, color misregistration, reductions in the brightness of peripheral portions of an image caused by light sources peripheral to the LF lens, and reductions in the sharpness of the image caused by characteristics of the LF lens.

When image data which has undergone image processing in the image processor 40 is used to record an image on photographic printing paper, the image data which has undergone image processing in the image processor 40 is output from the I/O controller 38 to the printer 16 via the I/F circuit 54 as image data for recording. Alternatively, when the image data which has undergone image processing is output to the outside as an image file, the image data is output from the I/O controller 38 to the personal computer 42. Therefore, in the personal computer 42, the image data for external output which was input from the I/O controller 38 is output to the outside (i.e. to one of the above drivers or communication control devices) as an image file via the expansion slot.

The printer 16 is provided with an image memory 58, R, G, and B laser light sources 60, and a laser driver 62 for controlling the operation of the laser light sources 60. Image data for recording input from the image processing apparatus 14 is temporarily stored in the image memory 58. It is then read from there and used to modulate the R, G, and B laser lights emitted from the laser light sources 60. The laser light emitted from the laser light sources 60 is scanned onto photographic printing paper 68 via a polygon mirror 64 and an fθ lens 66. The image is thus exposed and recorded onto the photographic printing paper 68. The printing paper 68 on which the image has been exposed and recorded is transported into a processing section 18 where it is subjected to respective processings of color-developing, fixing, rinsing and drying. Thereby, the image which has been exposed and recorded on the printing paper 68 is visualized.

Operation of the present embodiment will now be explained. The processings for calculating the density and color conversion conditions in the present embodiment is the processings used in the image processing method according to the seventh aspect of the present invention, and are achieved by the CPU 46 of the auto setup engine 44 executing the program for calculating the density and color conversion conditions. The density and color conversion conditions calculation program is stored on an information storage medium 72 (see FIG. 1) together with programs which allow other processings to be executed by the CPU 46. Note that, in FIG. 1, the information storage medium 72 is depicted as a floppy disk, however, another information storage medium such as a CD-ROM or a memory card may also be used.

The information storage medium 72 is loaded into an unillustrated information reading device connected to the personal computer 42. When an instruction is given to install the programs from the information storage medium 72 onto the image processing device 14, the programs for calculating the density and color conversion conditions and the like are read from the information storage medium 72 by the information reading device and stored in the ROM 50 whose storage contents are rewritable.

When the time for the processing to calculate the density and color conditions arrives (i.e. when the prescan data from the scanner 12 is input into the image processing apparatus 14, and the processings to extract the image data from the prescan data (i.e. the image prescan data) and the like by the auto setup engine are completed), the program for calculating the density and color conversion conditions is read from the ROM 50 and is executed by the CPU 46. Therefore, the auto setup engine functions as the image processing apparatus according to the first and second aspects of the present invention. In this way, the information storage medium 72 which stores the density and color conversion conditions calculation program and the like equates to the recording medium of the eighth aspect of the present invention.

The density and color conversion conditions calculation processing is a processing to calculate each of the processing conditions of the density and color conversion processings executed by the image processor 40 for each film image recorded on a single photographic film 26. Specifically, two types of correction are performed in the density and color conversion processing.—One type is gray balance correction which corresponds to the correction of bias in the color balance caused by the photographing and recording characteristics. The other type is alternative light source correction which corresponds to the correction of bias in the color balance of an image caused by the light source present during the photographing and recording. Therefore, in the processing to calculate density and color conversion conditions, the gray balance correction processing conditions (gray balance correction conditions) and the alternative light source correction processing conditions (alternative light source correction conditions) are both calculated for each film image.

The calculation of the density and color conversion conditions will be explained in detail below with reference made to the flow charts shown in FIGS. 2A and 2B. Note that, in the example below, the density and color conversion conditions are calculated for negative images recorded on a negative film which corresponds to the photographic film 26.

Figure 3A:
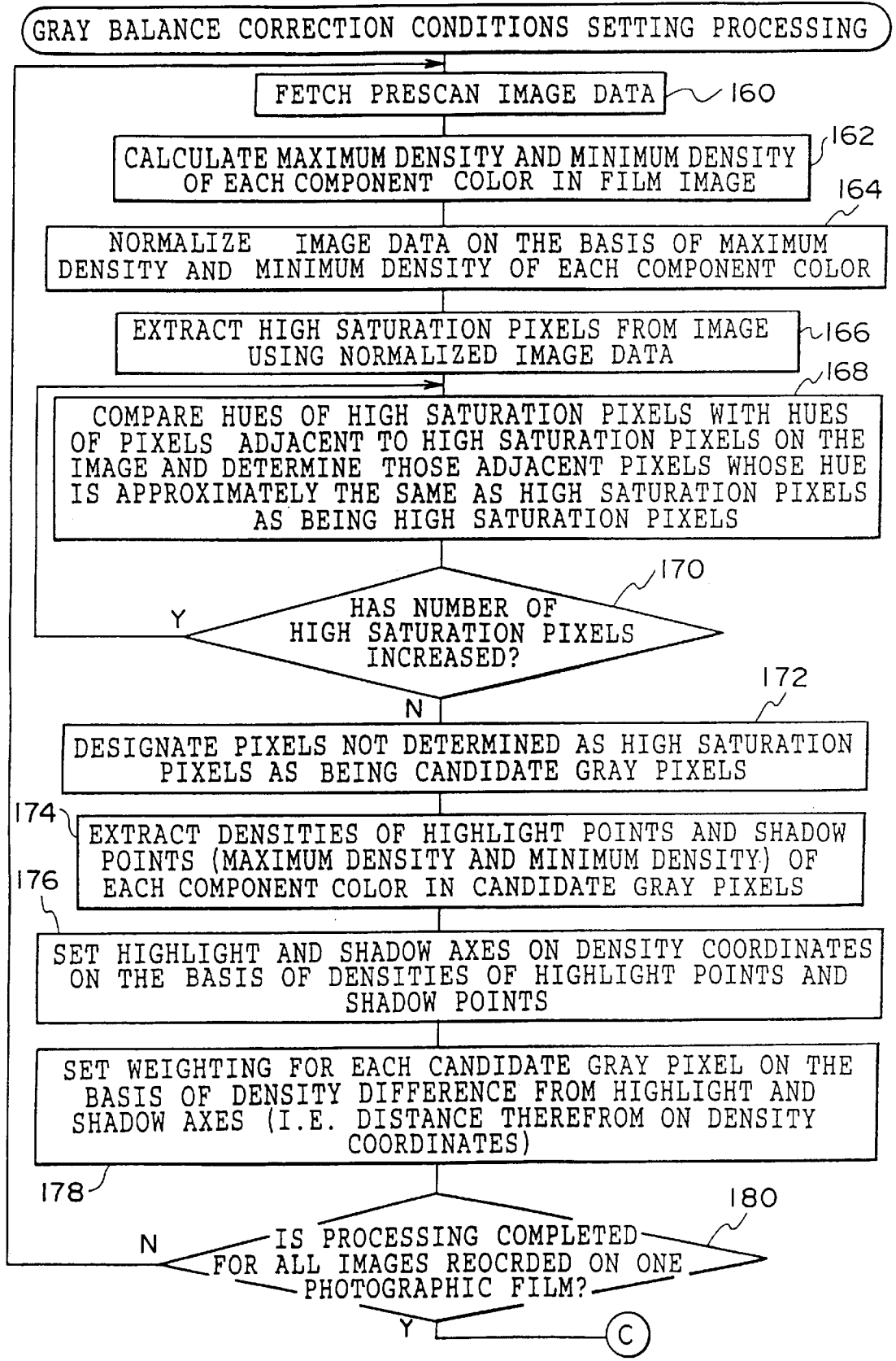
FIGS. 3A and 3B are flow charts showing the content of processing for calculating gray balance correction conditions.
Figure 3B:
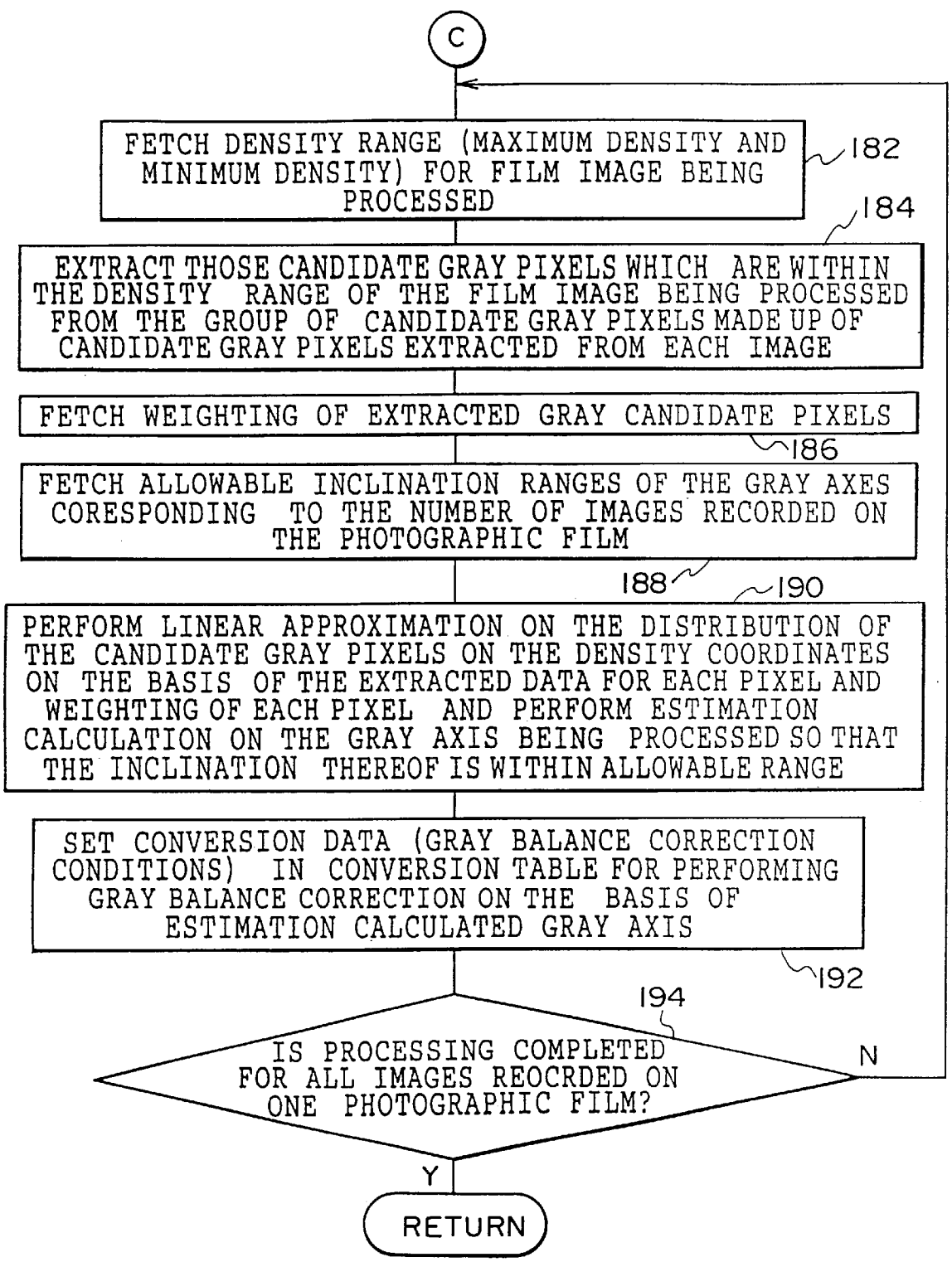

In step 100, the gray balance correction conditions calculation processing to calculate the gray balance correction conditions for each film image is performed. This processing will be explained below while referring to the flow charts in FIGS. 3A and 3B. In step 160, the prescan image data of the film image to be processed is fetched. Note that the prescan image data represents density values of each component color (R, G, B) for all pixels in a film image. In the next step 162, the maximum density $Dj_{max}$ and the minimum density $Dj_{min}$ (j represents one of R, G, or B) are calculated for each component color on the basis of the density value of each pixel in the film image represented by the fetched prescan image data.

In step 164, the maximum densities for each component color ($Dr_{max}$, $Dg_{max}$, and $Db_{max}$) are set as temporary highlight point densities, and the minimum densities for each component color ($Dr_{min}$, $Dg_{min}$, and $Db_{min}$) are set as temporary shadow point densities on the basis of the maximum density $Dj_{max}$ and the minimum density $Dj_{min}$ obtained for each component color from the prescan image data. The density values for each pixel in the film image are then normalized for each component color. This normalization can be performed using the formula given below.

$$Dj' = 100 \times (Dj - Dj_{min})/(Dj_{max} - Dj_{min})$$

Wherein Dj represents the density value of the component color j of the pixel which is the subject of the calculation, and Dj' represents the normalized density value of the component color j.

Figure 5A:
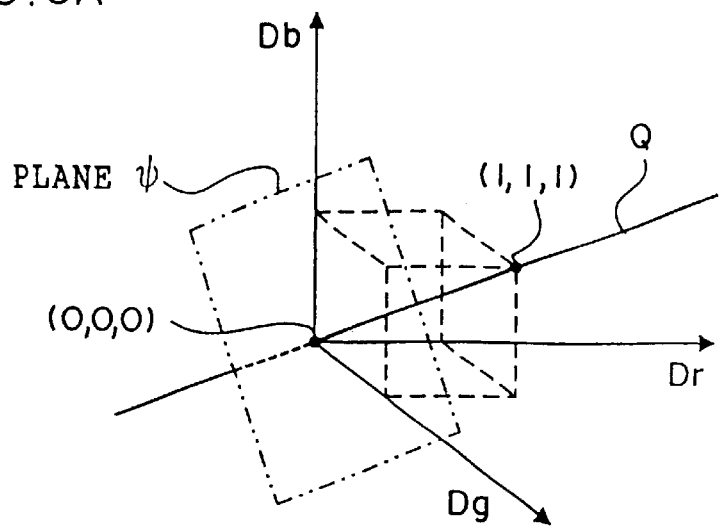
FIGS. 5A to 5C are conceptual views for explaining the extraction of high saturation pixels from a film image.

In the next step 166, the saturation for each pixel is calculated using the normalized image data and high saturation pixels are extracted from the film image. An example thereof is shown in FIG. 5A. A plane ψ, (a plane in which R+G+B=0) which is perpendicular to a straight line Q which passes from the origin (0, 0, 0) through each of the points (1, 1, 1) inside the RGB density space, and includes the origin (0, 0, 0) is set relative to an RGB density space defined by 3-dimensional density coordinates using the R density Dr, the G density Dg, and the B density Db as the coordinate axes. The density point of each pixel on the RGB density coordinates corresponding to the normalized density values for each component color of each pixel (Dr', Dg', Db') is then mapped on the plane ψ.

Figure 5B:
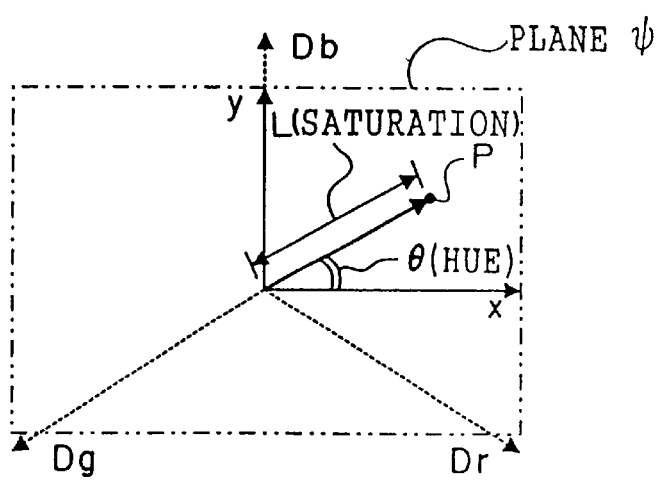

Next, the xy orthogonal coordinates shown in FIG. 5B are set on the plane ψ. If the mapped position on the plane ψ of the density point corresponding to the normalized density value of a particular pixel is set as the point P, the hue of this particular pixel corresponds to the angle θ formed by the x axis and a straight line passing through the origin of the xy coordinates and the point P (hereafter called the hue angle θ). Moreover, the saturation of the particular pixel corresponds to the distance between the origin of the xy coordinates and the point P. Note for reference that the pixel brightness can be determined by a calculation formula (for example, brightness=(Dr'+Dg'+Db')/3) based on the normalized density for each component color.

Figure 5C:
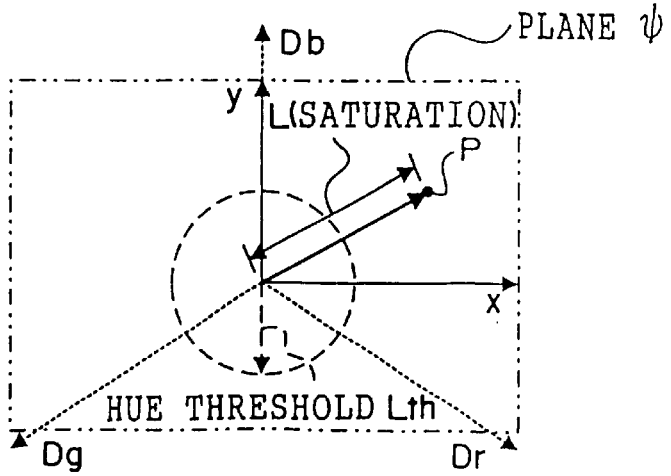

Accordingly, the mapped position on the plane ψ of the density point corresponding to normalized density value (the position of the point P) is obtained for each pixel, and, as is shown in FIG. 5C, by comparing the distance between the origin of the xy coordinates and the point P to the saturation threshold value Lth, a determination can be made as to whether or not the pixel is a high saturation pixel. Consequently, pixels in which the distance between the origin of the xy coordinates and the point P is greater than the saturation threshold value Lth can be extracted as high saturation pixels.

In the next step 168, the hue of a specific high saturation pixel is compared with the hues of the eight pixels surrounding the specific high saturation pixel (the so-called 8 adjacent pixels) in the film image. If the hue of any of the eight pixels surrounding the specific high saturation pixel approximates the hue of the specific high saturation pixel, then that pixel is also determined to be a high saturation pixel. This process is repeated for all the high saturation pixels extracted in step 166.

In step 170, a determination is made as to whether or not the number of pixels determined as being high saturation pixels has increased because of the processing in step 168. If the determination in step 170 is affirmative, the routine returns to step 168, and the hues of the newly determined high saturation pixels are compared to the hues of the pixels adjacent thereto (excepting for those adjacent pixels already determined to be high saturation pixels). Adjacent pixels whose hues is approximately the same are also determined to be high saturation pixels. This step 168 is repeated until the determination in step 170 is negative. When the determination in step 170 is negative, the routine proceeds to step 172 where those pixels determined as being high saturation pixels are removed and only those pixels not determined as being high saturation pixels are designated as being candidate gray pixels. These pixels designated as being candidate gray pixels are then stored.

For example, when the film image is one which includes a great number of high saturation pixels (i.e. the type of image in which color failure is liable to occur), a point is plotted at the position corresponding to each pixel of the film image RGB density coordinates. The distribution of these plotted points (referred to below simply as the pixel distribution on the RGB density coordinates), as in, the examples shown in FIGS. 6A and 6B, shows sets of high saturation pixels at positions slightly removed from the periphery of the sets of pixels estimated to represent the gray balance (namely, the "candidate gray pixel sets" in FIGS. 6A and 6B).

Figure 6A:
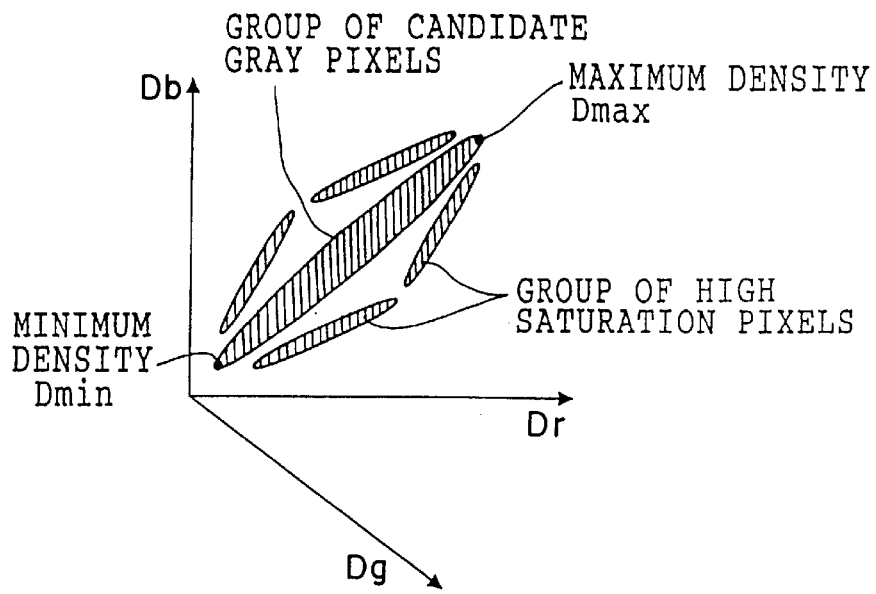
Figure 6B:
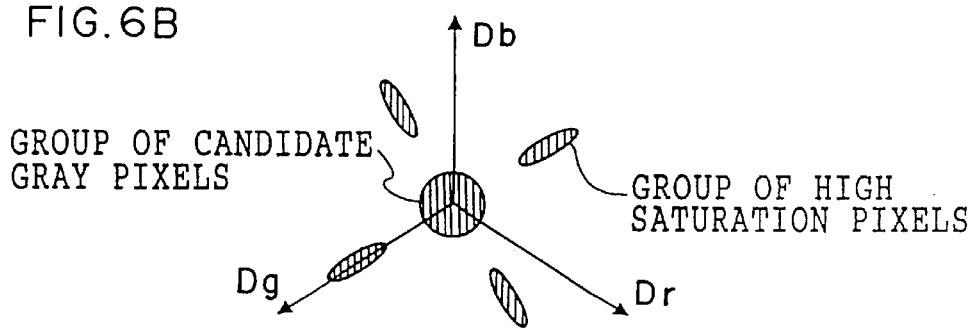

However, by performing the above processing, even if areas with a high probability of causing color failure, namely areas with a specific hue which includes high saturation pixels, are included in a film image, most of the pixels in that area (those pixels corresponding to "high saturation pixel groups" shown in FIGS. 6A and 6B) can be removed as being high saturation pixels. Accordingly, a high proportion of pixels corresponding to the gray portions of the photographed object (pixels representing the gray balance) are included in the pixels designated as being candidate gray pixels.

In the next step 174, the density Dhj of the highlight point (maximum density) and the density Dsj of the shadow point (minimum density) in the candidate gray pixels are both extracted for each component color from the prescan image data. Note that the dynamic range IR=(Dhr−Dsr), IG=(Dhg−Dsg), IB=(Dhb−Dsb) is determined for each component color and the difference in the dynamic range of each component color (IR−IG), (IG−IB), (IB−IR) is calculated. If the dynamic range difference exceeds a predetermined allowable limit, one of the highlight point densities (Dhr, Dhg, Dhb) is corrected so that the dynamic ranges IR, IG, IB are equal to each other.

Figure 6C:
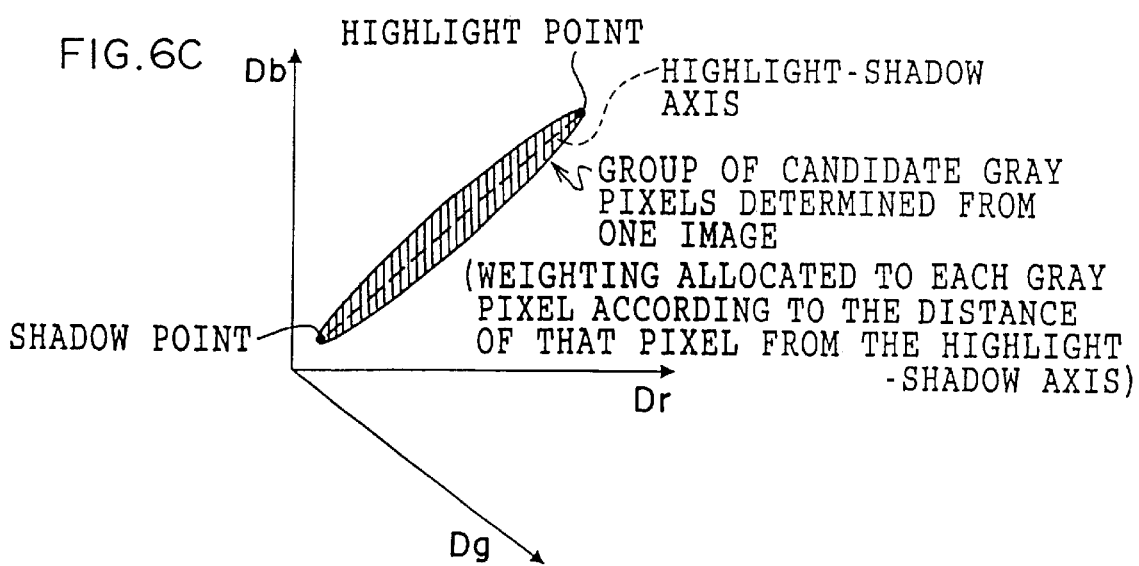
FIG. 6C is a conceptual view showing an example of the data distribution of each pixel using RGB density coordinates for an image from which the high saturation pixels have been removed.

In step 176, the highlight point densities of each component color (Dhr, Dhg, Dhg) are set as the density of the highlight point and the shadow point densities (Dsr, Dsb, Dsg) are set as the density of the shadow point on the basis of the highlight point density Dhj and shadow point density Dsj obtained for each component color from the candidate gray pixels. An axis joining the density point corresponding to the highlight point on the RGB density coordinates and the density point corresponding to the shadow point on the RGB density coordinates is then set (see FIG. 6C).

In order to attain vivid color development, a photographic film is generally provided with a photosensitive layer so that a multi-color exposure is finished with a higher contrast than a gray exposure, even when the amount of exposure is uniform (this is known as a multilayered effect). It is therefore possible that image regions corresponding to non-gray portions (e.g. reds and the like) of the photographed object will have a higher maximum density than image regions corresponding to gray portions of the photographed object in a film image.

Based on the above, in the present embodiment, the image data is normalized (step 164) on the basis of the maximum density $Dj_{max}$ and the minimum density $Dj_{min}$ obtained in step 162, and the high saturation pixels are removed (steps 166 to 172). The densities of the highlight point and shadow point are then determined from the prescan image data (step 174), and a highlight—shadow axis is set based on the highlight density point and the shadow density point (step 176). By setting the highlight—shadow axis after determining the densities of the highlight point and shadow point without setting the highlight—shadow axis using the maximum density $Dj_{max}$ and the minimum density $Dj_{min}$, as described above, it is possible to suppress highlight failures.

In the next step 178, the position of the point corresponding to each of the candidate gray pixels on the RGB density coordinates is determined. In step 178, the distance between the determined position and the highlight—shadow axis (a geometric distance inside the density space: corresponds to the difference in density between the determined positions and the highlight shadow axis) is also calculated. The weighting for each candidate gray pixel is then set so that, as the distance (the difference in density) between the position of the corresponding point on the RGB density coordinates and the highlight—shadow axis increases, the weighting is decreased (and so that as the distance (difference in density) decreases, the weighting is increased). This set weighting is then stored.

In step 180, a determination is made as to whether or not the above processing has been performed for all of the film images on the one photographic film 26. If the determination is negative, the routine returns to step 160 and the processings of steps 160 to 178 are repeated. Accordingly, each gray candidate pixel is extracted from all film images recorded on the same photographic film 26, and a weighting is set for all of the extracted candidate gray pixels.

If the determination in step 180 is affirmative, the routine proceeds to step 182. In step 182 and beyond, the gray axis representing the gray balance of the film image to be processed (one of the plurality of film images recorded on the one photographic film 26) is obtained by linear approximation, based on the group of candidate gray pixels (see FIG. 7A) made up of candidate gray pixels extracted from the plurality of film images recorded on the one photographic film 26.

Namely, in step 182, the density range of the film image to be processed (the maximum density $Dj_{max}$ and the minimum density $Dj_{min}$ calculated in step 162) is fetched. In the next step 184, the data for those candidate gray pixels corresponding to the density range of the film image to be processed (the density range from the maximum density $Dj_{max}$ to the minimum density $Dj_{min}$) fetched in the previous step 182 is extracted from each candidate gray pixel forming the group of candidate gray pixels Because the density range of each of the plurality of film images recorded on the photographic film is unfixed, the width of the distribution on the RGB density coordinates of the group of candidate gray pixels comprising the candidate gray pixels extracted from the plurality of film images corresponds to the color forming density range of the photographic film 26 (generally, this width has a density value of approximately 3.0). Meanwhile, the density range of each film image recorded on the photographic film has a density value of approximately 1.0. Accordingly, in step 184, the data of only those candidate gray pixels in a density range which is a portion of the entire density range of the group of candidate gray pixels is extracted, an example of which is shown in the "density range of the image whose gray axis is being estimated" in FIG. 7B.

In the next step 186, the data representing the weighting of the candidate gray pixels whose data was extracted in step 184 is fetched. In step 188, the allowable range of the inclinations of the gray axes corresponding to the number of film images recorded on the photographic film 26 being processed is fetched from the allowable range of inclinations of gray axis corresponding to the number of film images on the photographic film which has been set in advance. Note that the allowable range of the inclinations of the gray axis described here is set so that the allowable range decreases as the number of film images decreases.

Next, in step 190, based on the data of the candidate gray pixels extracted in step 184 and the weighting for each candidate gray pixel extracted in step 186, linear approximation is performed on the distribution on the RGB density coordinates of the extracted candidate gray pixels taking into account the weighting given to each candidate gray pixel. The gray axes of the film images being processed are calculated so that it can be estimated that the inclinations will fall inside the allowable range fetched in step 188. Note that this gray axis estimation calculation corresponds to the gray balance estimation made using normalizing means of the second aspect of the present invention.

Note also that the linear approximation is performed using, for example, a method such as the least squares method or the like used in linear multiple regression analysis, and can be performed so that the error prediction sum of squares is at the minimum. In this case, placing the inclinations of the gray axis inside the allowable range can be achieved, for example, by adding to the simultaneous equation a conditional equation restricting the values of those variables which govern the inclination of the gray axis from among the variables governing the gray axes to values within a range of numerical values which corresponds to the above allowable range, whenever the calculation using the least squares method is performed.

Furthermore, in the linear approximation which reflects the weighting of the candidate gray pixels, the following conversions are performed. For pixels with a large weighting, the candidate gray pixel data is converted so that the data shows that the number of candidate gray pixels present at substantially the same position within the RGB density space has increased (e.g. the data for 1 pixel is converted into being the data for 100 pixels). For pixels with a small weighting, the candidate gray pixel data is converted so that the data shows that the number of candidate gray pixels present at substantially the same position within the RGB density space has decreased (e.g. the data for 100 pixels is converted into being the data for 1 pixel). This converted candidate gray pixel data is then used to perform the linear approximation.

Furthermore, the linear approximation may be performed in 3-dimensional space (RGB density space), or may be performed in a plurality of 2-dimensional spaces (e.g. in each of the density spaces R-G, G-B, and B-R). For example, estimation of the gray axis in RGB density space based on linear approximation may be carried out by performing linear approximation on the distribution in RGB density space of candidate gray pixels present within one of the following density ranges: i.e. the density range of the film image being processed may be either the density range in the film image of a specific component color, or the density range in the film image for the RGB average density.

Estimation of the gray axis in each of R-G, G-B, B-R density spaces by linear approximation may be achieved by the following. For example, for the R-G density space, linear approximation is performed on the distribution of candidate gray pixels present within the R density range in the film image. For the G-B density space, linear approximation is performed on the distribution of candidate gray pixels present within the G density range in the film image. For the B-R density space, linear approximation is performed on the distribution of candidate gray pixels present within the B density range in the film image. The axis corresponding to the center of gravity of the 3 axes obtained by linear approximation for each of the above spaces can be calculated as being: the gray axis.

In the next step 192, the gray balance processing conditions for the gray balance correction processing of the fine scan image data (the gray balance correction conditions; specifically the conversion data set to the LUT (Look Up Table) for the gray balance correction processing) is set so that the gray portions of the subject at the time of the photography and exposure are reproduced as gray in the output image, on the basis of the results of the estimation calculation of the gray axis of the film image being processed. Note that the above gray balance correction conditions correspond to the conditions required for "normalizing the image data of the original image to be processed using the estimated gray balance as a reference" of the normalizing means of the second aspect of the present invention.

The above gray balance correction conditions may be set so that the following can be achieved. When, for example, the relationship between the G density Dg and the R density Dr (which relationship corresponds to the result when the gray axis is projected on two-dimensional density coordinates having coordinate axes of the G density and the R density) from among the gray balances represented by the estimation calculated gray axis is expressed by $Dg=\alpha rg \cdot Dr + \beta rg$, and when the relationship between the G density Dg and the B density Db (which relationship corresponds to the result when the gray axis is projected on two-dimensional density coordinates having coordinate axes of the G density and the B density) is expressed by $Dg=\alpha bg \cdot Db + \beta bg$, then, for example, the G density Dg is left unconverted, and the R density Dr is converted according to the conversion formula $Dr=\alpha rg \cdot Dr + \beta rg$, and the B density Db is converted according to the conversion formula $Db=\alpha bg \cdot Db + \beta bg$.

In the next step 194, a determination is made as to whether or not the above processing (i.e. the gray axis estimation calculation and the setting of the density color conversion processing conditions) has been performed for all film images recorded on the one photographic film 26. If the determination is negative, the routine returns to step 182 and the processings of steps 182 to 192 are repeated for all the film images. Accordingly, calculations are performed to estimate each of the gray axes which represent the gray balances, and gray balance correction conditions are set for each single film image of all the film images recorded on the one photographic film 26. .Note that there is a limit to the accuracy of the extraction of the candidate gray pixels in the above-explained steps 160 to 172. For example, when the film images being processed are images liable to color failure or highlight failure, for example, in some cases, it is not possible to extract suitable pixels as the candidate gray pixels (i.e. pixels representing a gray balance).

In contrast, in the present embodiment, candidate gray pixels are respectively extracted from a plurality of film images recorded on the same photographic film 26, and a candidate gray pixel group made up of these candidate gray pixels extracted from the plurality of film images is used when estimating the gray balance. Because the candidate gray pixel group is formed from candidate gray pixels each extracted from a plurality of film images, any unevenness in the image contents of the plurality of images is averaged out over the entire group of candidate gray pixels. Therefore, even if it is not possible to extract a suitable pixel as a candidate gray pixel from a specific film image, the adverse effect of not being able to extract a suitable pixel is alleviated.

Accordingly, the distribution of the candidate gray pixel group on the RGB density coordinates taken as a whole accurately represents the gray balance over the entire color forming density range of the photographic film 26 (i.e. the gray balance of each film image recorded on the photographic film 26). By estimating the gray balance using this candidate gray pixel group, it is possible to estimate with a high degree of accuracy the gray balance in each film image recorded on the same photographic film. Moreover, suitable gray balance correction conditions for converting image data in such a way that bias in the color balance of a film image caused by the film characteristics is corrected (i.e. in such a way that gray portions of the subject at the moment of photographing and recording can be reproduced as gray) can be obtained.

Figure 7A:
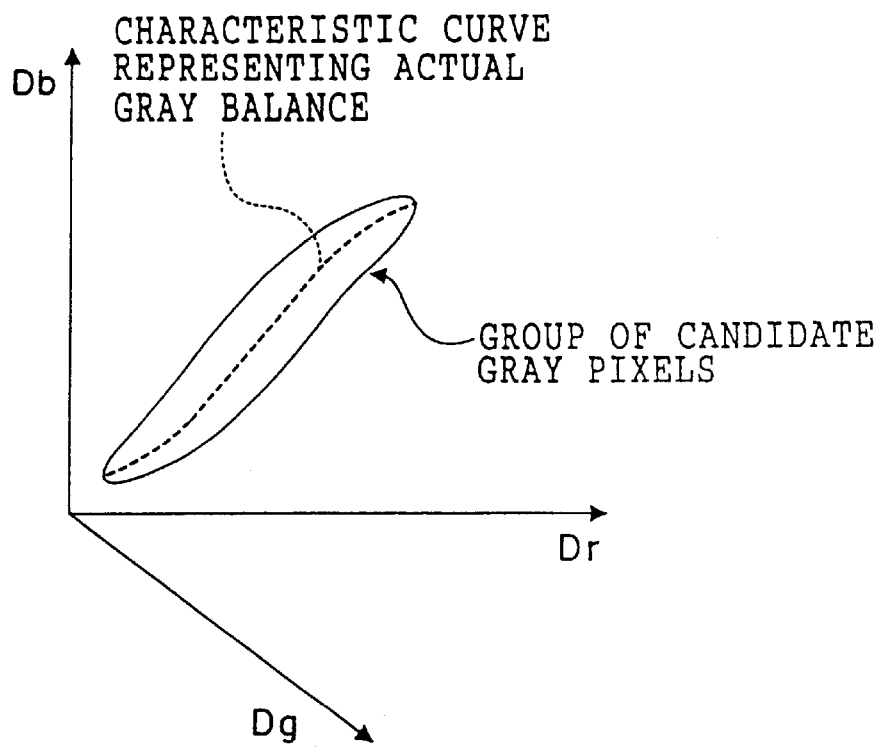
Figure 7B:
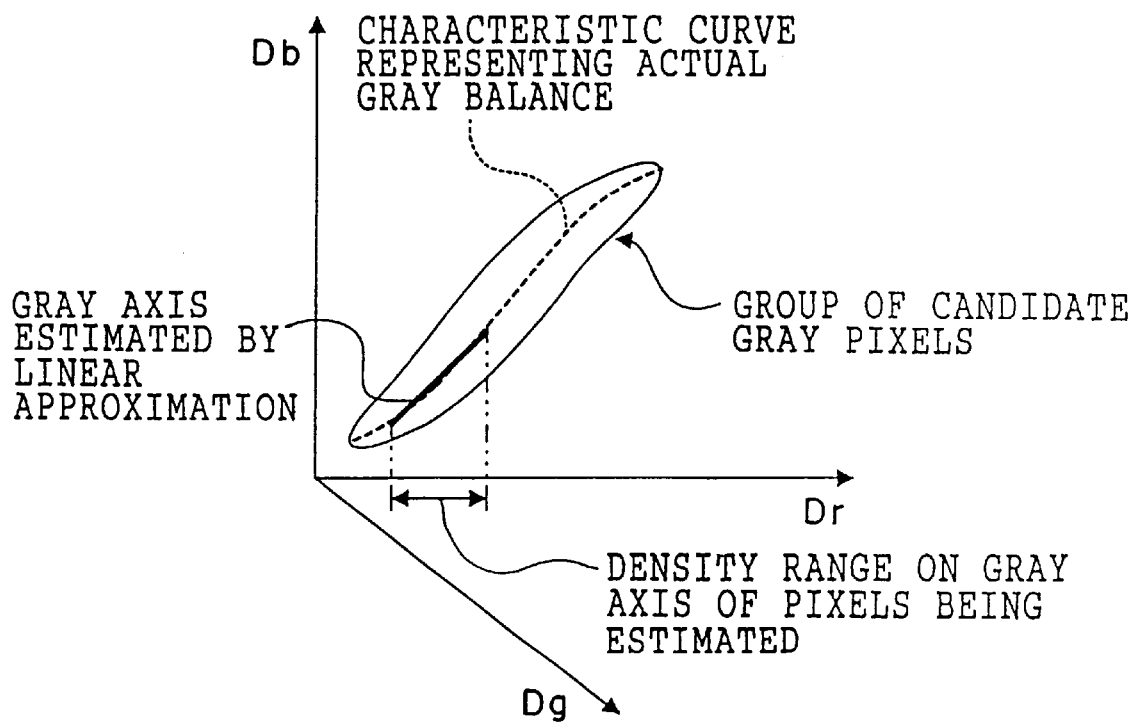
FIG. 7B is a conceptual view explaining the estimation of a specific image gray axis from the gray candidate pixel group shown in FIG. 7A.

Furthermore, the gray balance over the entire color forming density range of the photographic film 26 which is represented by the distribution of the candidate gray pixels on the RGB coordinates, reflects the film characteristics and forms a curved line on the RGB density coordinates as shown by the broken line in FIG. 7A (see the "Characteristic curve representing actual gray balance" indicated by the broken line in FIG. 7A).

In contrast to this, in the present embodiment, the calculation to estimate the gray axis which represents the gray balance is performed by performing linear approximation on the distribution on the RGB density coordinates of the candidate gray pixel group within the density range of each film image (i.e. within a density range far narrower than the color forming density range of the photographic film 26), with each film image taken as a single unit. Therefore, compared with obtaining the characteristic curve representing the gray balance by a higher order non-linear approximation, the processing is far simpler and the gray balance can be estimated with a sufficiently high level of accuracy and with a sufficiently high degree of stability for each film image. Moreover, suitable gray balance correction conditions based on gray axes accurately representing the gray balance can be obtained.

When the determination in step 194 is affirmative, the processing to calculate the gray balance correction conditions is completed, and the routine proceeds to the processing to calculate the density and color correction conditions in step 102 (FIGS. 2A and 2B). The alternative light source correction conditions are calculated for each film image in step 102 and subsequent steps.

Namely, in step 102, the image data of a specific film image (prescan image data) being processed is fetched, and the gray balance correction conditions set for this specific film image are also fetched from among the gray balance correction conditions calculated in the gray balance correction conditions calculation processing explained above. The image data is then normalized (i.e. undergoes gray balance correction) by converting the prescan image data of the fetched specific film image in accordance with the fetched gray balance correction conditions.

This data normalization enables image data to be obtained in which the bias in the color balance caused by the film characteristics (photographing and recording characteristics) has been corrected. Note that step 102 corresponds to the normalizing means of the second aspect of the present invention as well as to the processing to calculate the conditions for correcting the gray balance explained above.

In step 104, the candidate gray pixel data extracted from the specific film image in (step 172 of) the previous gray balance correction conditions calculation processing is fetched. In the next step 106, a plurality of pixels estimated to correspond to highlight portions in the specific image (highlight pixels) are extracted from the candidate gray pixel data fetched in step 104.

The extraction of the highlight pixels may be performed by, for example, calculating the average value of the density of each component color (three-color average density) for each pixel and then preparing a histogram of the three-color average density. The pixels belonging to a particular area which is the interval until the cumulative frequency reaches a predetermined value beginning from the high density side are then extracted. Moreover, the pixels extracted as highlight pixels may also be limited to pixels present at positions adjacent to each other on the film image.

Note that the color of the highlight portions in a film image recorded by photography using an alternative light source has a specific hue and is a high saturation color corresponding to the type of light source used during the photographing and recording. However, because the candidate gray pixels are extracted after normalizing has been performed using the maximum density and minimum density of the film image as references, then even if the film image was recorded by photography using an alternative light source, the data of pixels corresponding to the actual highlights are included in the data of the candidate gray pixels fetched in step 104.

In step 108, the data of each of the plurality of highlight pixels extracted in step 106 is extracted from the normalized image data of a specific film image obtained by the normalizing process in step 102. Then, in step 110, on the basis of the data of the plurality of highlight pixels extracted from the normalized image data, the average density of each component color is calculated for the plurality of highlight pixels as light source color data which represents the color of the light source during the photographing and recording. Because the light source color data is determined from the normalized image data, any bias in the color balance caused by the film characteristics has been corrected. Consequently, the color represented by the light source color data expresses the light source color (the color tint of the illumination light from the light source) of the light source used during the photographing and recording of the object with a high degree of accuracy.

In step 112, on the basis of the light source color data calculated in step 110, the highlight color vector HL which represents the hue and saturation of highlight portions in the specific film image being processed is determined. This highlight color vector HL may be determined in the same way as in, for example, the gray balance correction conditions calculation processing of step 166 (FIGS. 3A and 3B) previously explained. Namely, the density points on the RGB coordinates corresponding to the average density for each component color of the highlight portions represented by the light source color data are mapped on a plane ψ. Subsequently, as is shown in the example in FIG. 8, the vector extending from the origin of the xy orthogonal coordinates fixed on the plane t (this origin is at the same position as the origin of the RGB density coordinates) to the mapped position PHL on the plane ψ is set as the highlight color vector HL. The angle formed between the x axis and the highlight color vector HL (the hue angle) represents the average hue of the highlight portion. The size H of the vector (i.e. the length) represents the average saturation of the highlight portion.

In the next step 114, a determination is made as to whether or not the light source color during the photographing and recording of the specific film image being processed is clearly non-gray on the basis of the highlight color vector HL determined in step 112. The origin of the xy orthogonal coordinates set on the plane ψ represents the gray balance calculated by the gray balance correction conditions calculation processing. Consequently, the extent of the bias in the light source color with respect to gray (a neutral color) is in direct proportion to the distance between the origin of the xy orthogonal coordinates and the mapped position $P_{HL}$. Accordingly, the determination in step 114 can be made by determining, for example, whether or not the size H of the highlight color vector is a predetermined value or more.

If the determination in step 114 is negative, a determination can be made that the specific film image being processed is not an image which was recorded by photography using an alternative light source. Consequently, the amount of color balance correction C (explained in detail below) for the specific film image being processed is set at 0 and the routine proceeds to step 128. If the determination in step 114 is affirmative, then the possibility exists that the specific film image being processed is an image which has been recorded by photography using an alternative light source. Therefore, in step 116 and subsequent steps, the correlation between the color of the highlight portions in the specific film image being processed and the color of all the pixels (i.e. of each element forming the specific film image) in the specific film image is determined.

Namely, in step 116, the data of a single pixel (a specific pixel) is fetched from the normalized image data of the specific film image obtained by the normalizing process of step 102, and the color vector CP (see FIG. 8) is calculated in the same way as in the previous step 112. In step 118, as a physical amount representing the angle (hue angle difference) formed by the highlight color vector HL and the specific pixel color vector CP, the cosine (inner product) COS of the hue angle difference between the highlight color vector HL and the specific pixel color vector CP is calculated according to the following formula. The result of the calculation is then stored.

$$COS = HL \cdot CP / |HL||CP|$$

In step 120, a determination is made as to whether or not the processings of steps 116 and 118 have been performed on all pixels in the specific film image being processed. If the determination is negative, the routine returns to step 116 and steps 116 to 120 are repeated until the determination in step 120 is affirmative. When the determination in step 120 is affirmative, the routine proceeds to step 122.

The color vectors CP of pixels whose hue differes greatly from that of the highlight portion, as is shown by the "hue angle difference with highlight color vector: large" color vector CP in FIG. 8, form large angles with the highlight color vector HL on the plane ψ (2-dimensional color coordinates) and the cosine COS of the hue angle difference is preceded by a negative symbol. Alternatively, even if the symbol is positive, the value thereof is small (the cosine COS of the hue angle difference<<1).

Furthermore, the color vectors CP of pixels whose hue approximates the highlight portions, as is shown by the "hue angle difference with highlight color vector: small" color vector in FIG. 8, form small angles with the highlight color vector HL on the plane ψ and the cosine COS of the hue angle difference is a value close to 1.

Figure 9:
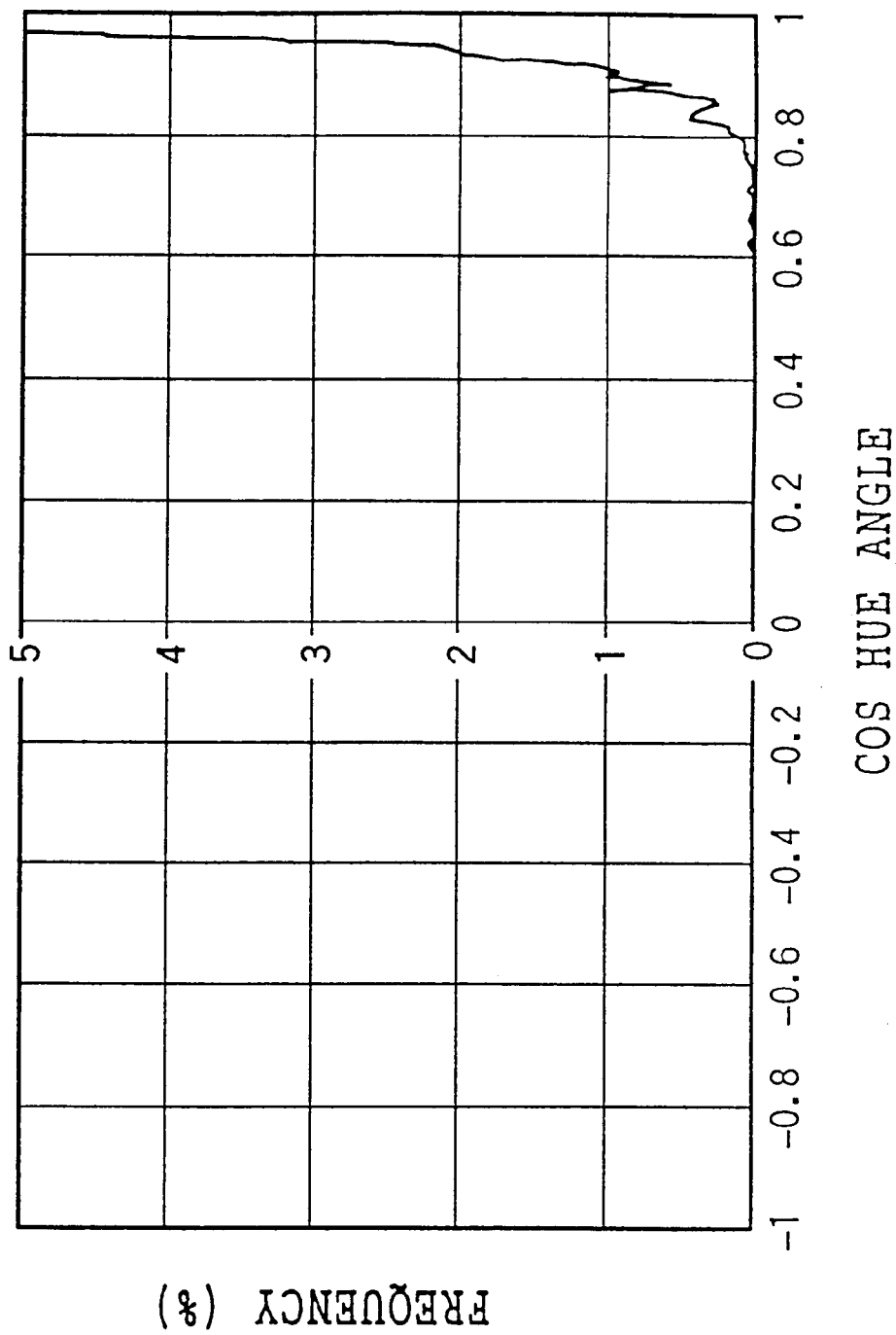
FIG. 9 is a diagram showing an example of an cumulative histogram of the cosines (inner products) COS of angles formed by the highlight color vectors and the color vectors of each pixel obtained from a film image recorded by photography using an alternative light source.

Film images recorded by photography under an alternative light source are affected by the light source so that the color of the highlight portions in the film image have a specific hue and high level of saturation correspondingly to the type of light source. Moreover, the color of non-highlight portions in the film image also end up being tinged with the same specific hue as the highlight portions. Accordingly, if a cumulative histogram is prepared from the side at which the value of the cosine COS of the hue angle difference is smaller, on the basis of the result of the calculation of the cosine COS of the hue angle difference for all the pixels in the film image, then the cosine COS of the hue angle difference of most of the pixels in film images recorded using an alternative light source is a value close to 1, as is shown in the example in FIG. 9. Moreover, the minimum value of the cosine COS of the hue angle difference is a relatively high value (this value is approximately 0.6 in the example in FIG. 9).

Figure 10:
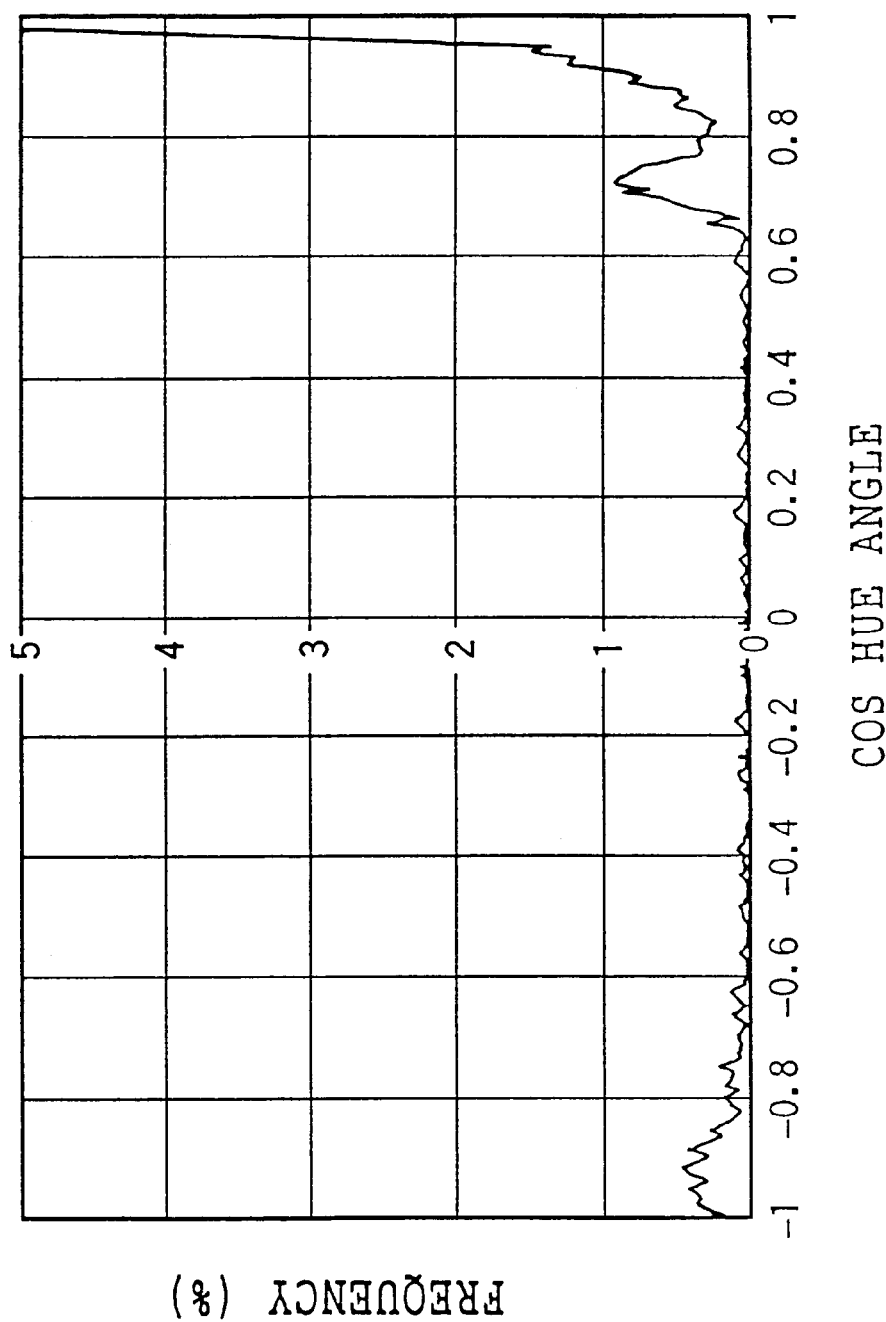
FIG. 10 is a diagram showing an example of an cumulative histogram of the cosines (inner products) COS of angles formed by the highlight color vectors and the color vectors of each pixel obtained from a film image liable to color failure.
Figure 11:
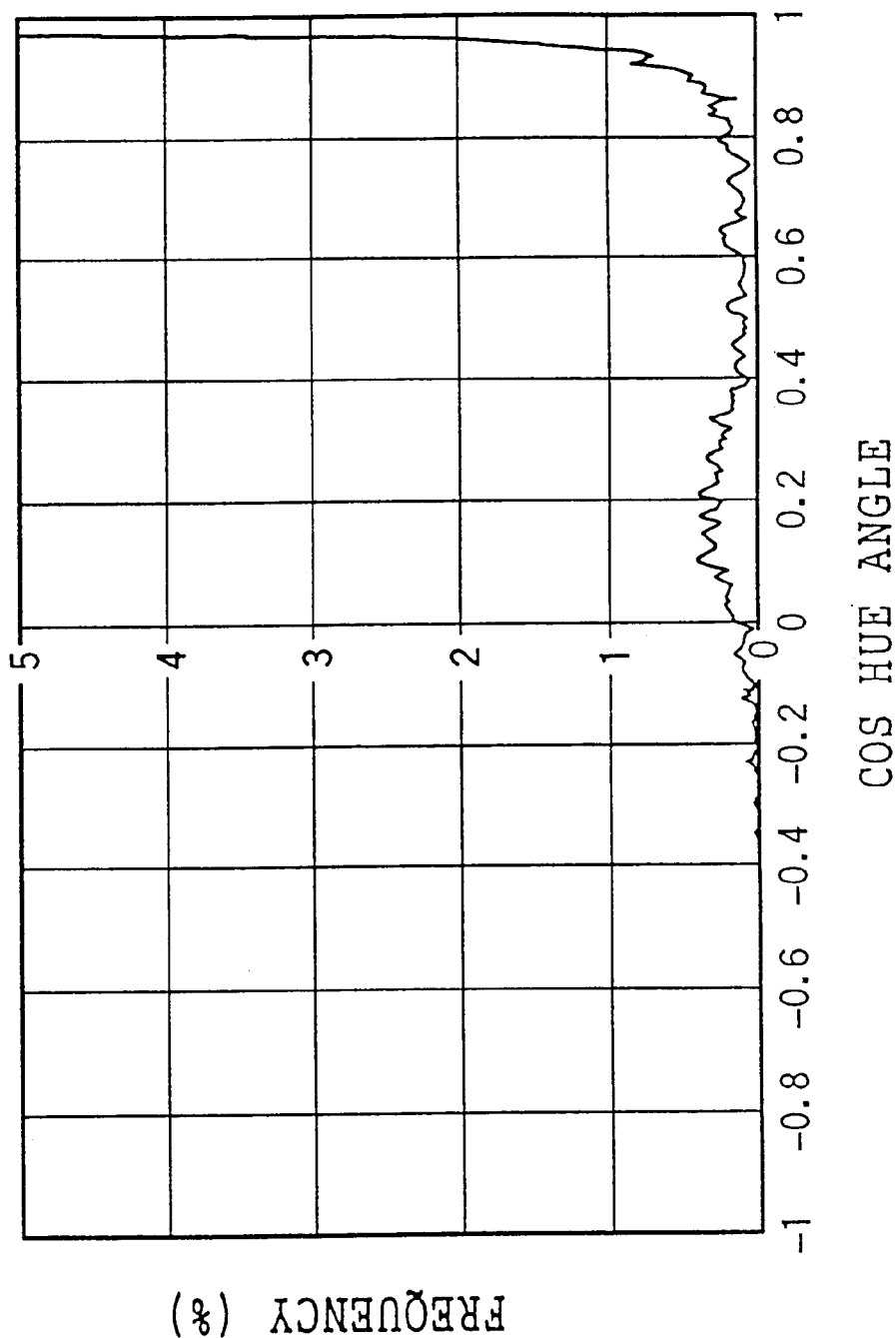
FIG. 11 is another diagram showing an example of an cumulative histogram of the cosines (inner products) COS of angles formed by the highlight color vectors and the color vectors of each pixel obtained from a film image liable to color failure.

Meanwhile, on a film image in which color failure is liable to occur, areas with a uniform hue occupy a large part of the image. Therefore, when the highlight portions of a film image exist in these areas with the uniform hue, the cosine COS of the hue angle difference is a value close to 1 for a large number of pixels, in the same way as described above. FIGS. 10 and 11, however, both show cumulative histograms of the cosine COS of the hue angle difference determined from film images which are unrelated to each other (however, both being film images on which color failure is liable to occur) and, as can be clearly understood from these figures, even when the image content in film images recorded by photography using a typical light source such as daylight is image content which is liable to color failure, the minimum value of the cosine COS of the hue angle difference is obviously smaller (approximately −1 in the example in FIG. 10 and approximately −0.4 in the example in FIG. 11) than in images recorded by photography using an alternative light source.

It may also be easily understood that, in the same way as described above, the minimum value of the cosine COS of the hue angle difference is clearly a small value in film images in which highlight failure is liable to occur as compared with images recorded by photography using an alternative light source.

Based on the above, in step 122, the minimum value of the cosine COS of the hue angle difference calculated for all the pixels is extracted as a physical amount representing the correlation between the color of the highlight portions on a film image and the color of each element forming the original image (i.e. a hue angle correlation T). Note that steps 104 to 122 correspond to calculating means of the first and second aspects of the present invention, and also correspond to the calculation means described in any of the third through fifth aspects of the present invention.

Figure 12:
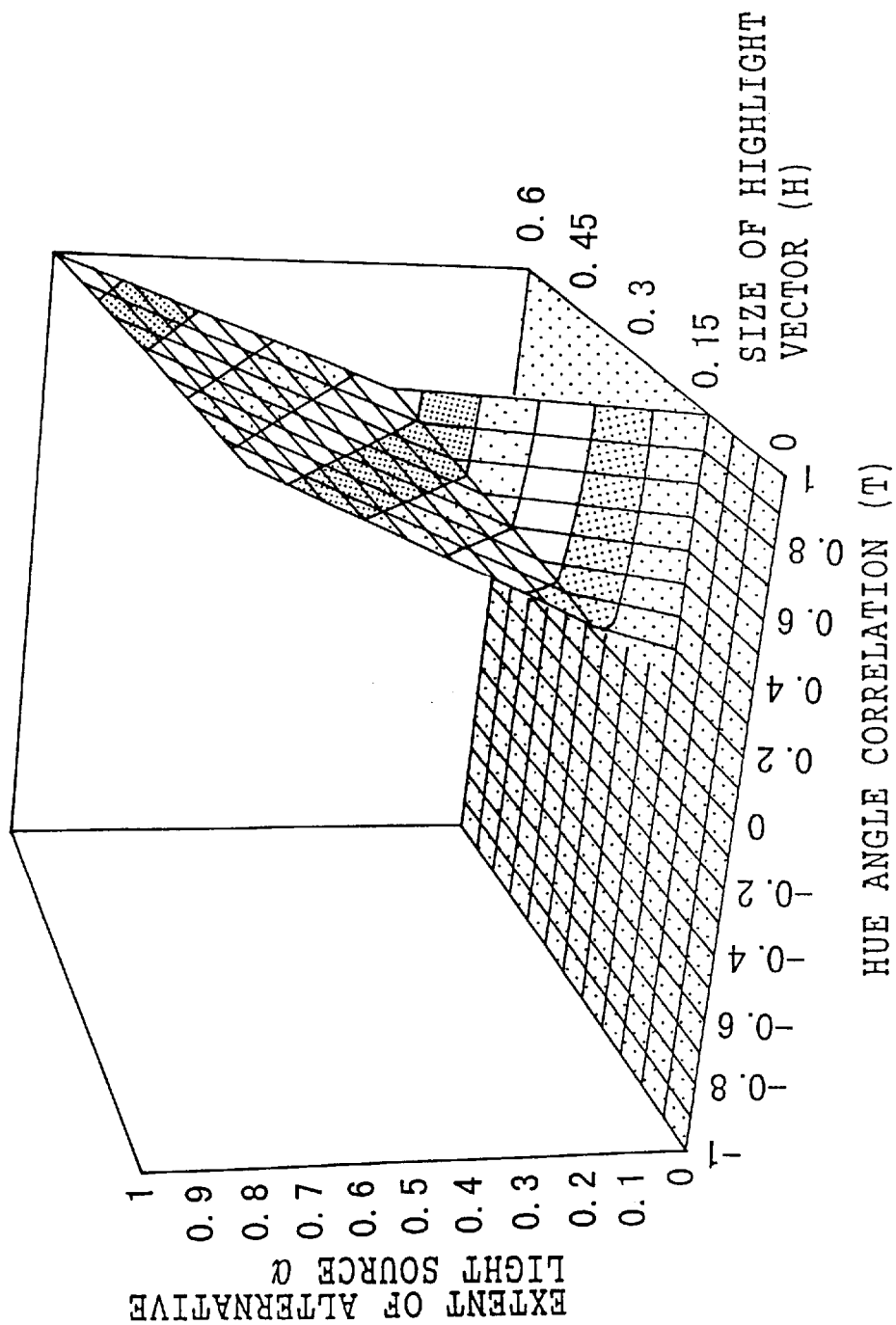
FIG. 12 is a diagram showing an example of an alternative light source determining table for obtaining a degree $\alpha$ of an alternative light source from a hue angle correlation T and the highlight color vector size H.

Then in step 124, the extent or degree α of the alternative light source is calculated based on the size H of the highlight color vector and the hue angle correlation T. Note that the extent α of the alternative light source can be calculated using a map, such as that shown in FIG. 12, showing the relationship between the extent α of the alternative light source and the size H highlight color vector together with the hue angle correlation T. Note also that step 124 corresponds to the determining means described in the first and second aspects of the present invention, and the extent α of the alternative light source corresponds to the extent of bias in the color balance of the present invention.

In the map shown in FIG. 12, the value of the extent α of the alternative light source is set so as to equal 0 when the hue angle correlation T is less than a predetermined value (less than 0.2 in the example shown in FIG. 12) regardless of the size H of the highlight color vector HL. Moreover, the value of the extent α of the alternative light source is also set so as to equal 0 when the size H of the highlight color vector HL is less than a predetermined value (less than 0.15 in the example shown in FIG. 12) regardless of the hue angle correlation T. As a result, in film images recorded by photography using a typical light source such as daylight, even when the images are liable to color failure or to highlight failure, the extent α of the alternative light source can be set so as to equal 0.

The extent α of the alternative light source according to the present embodiment represents the extent of bias in the color balance of a film image caused by the light source at the time of photography and exposure. As will be explained below, because the amount of the alternative light source correction is determined in accordance with the value of the extent α of the alternative light source, alternative light source correction essentially is not performed on film images recorded by photography using a typical light source such as daylight. Consequently, there is no reduction in the image quality of the output image due to the alternative light source correction.

Furthermore, in the map shown in FIG. 12, when the hue angle correlation T is a predetermined value or greater (e.g. 0.2) and the size H of the highlight color vector HL is a predetermined value or greater (e.g. 0.15), then the value of the extent α of the alternative light source is set so as to increase as the size of the hue angle correlation T increases and the value of the extent α of the alternative light source is set so as to increase as the size H of the highlight vector HL increases. Accordingly, the amount of alternative light source correction is in accordance with the extent of the bias in the color balance of the film image caused by the light source at the time of photographing and recording for film images recorded by photography under an alternative light source.

In the next step 126, the amount of the color balance correction C which depends on the bias in the color balance represented by the highlight color vector HL is calculated using the following formula on the basis of the extent α of the alternative light source determined in step 124.

$$C = \alpha HL$$

In step 128, a determination is made a to whether or not the processings of step 102 and subsequent steps have been performed on all the film images recorded on the one photographic film. If the determination is negative, the routine returns to step 102 and the processings of steps 102 and subsequent steps are repeated for all the film images. As a result, the extent a of the alternative light source is fixed for all film images recorded on the one photographic film.

Once the extent α of the alternative light source has been set for all the film images, the determination in step 128 is affirmative and the routine proceeds to step 130. In step 130, the highlight color vectors HL determined from each film image are compared to each other. In the next step 132, a determination is made as to whether or not there exists a group of film images whose highlight color vectors HL closely resemble each other (for example, whether the differences in the hue angles are less than a predetermined angle, and whether the differences in the sizes H are less than a predetermined value). If the determination is negative, the routine proceeds to step 138.

When, however, a group of film images whose highlight color vectors HL closely resemble each other does exist, the determination can be made that each film image making up the group of the film images has been recorded by photography using the same type of alternative light source. Therefore, if the determination in step 132 is affirmative, the routine proceeds to step 134 and the average value of the amount of correction of the color balance C in each of the film images making up the group of film images whose highlight color vectors closely resemble each other is calculated.

In the next step 136, the average value of the amounts of correction of the color balance C calculated in step 134 is set as the amount of correction of the color balance for each of the film images making up the group of film images. Therefore, the color balance in each of the film images whose highlight color vector HL is approximately the same is corrected by the same correction amount. As a result, the color balance of the output images of each of the film images is approximately the same.

Note that if a determination is made that there are a plurality of groups present whose highlight color vectors HL closely resemble each other, the average value of the amounts of correction of the color balance C is calculated for each separate group of film images (step 134), and the average value of the amounts of correction of the color balance C is set for only those film images which make up the corresponding group of film images (step 136).

Next, in step 138, the processing conditions (alternative light source correction processing conditions: refers specifically to the conversion data set in the LUT for performing the alternative light source correction processing) for the alternative light source correction processing of the fine scan image data for each film image are set on the basis of the fixed amount of correction of the color balance C. The density and color correction conditions calculation processing is then completed. Note that the processing of steps 126 and beyond from among the aforementioned density and color correction conditions calculation processing corresponds to the correcting means of the first and second aspects of the present invention. Moreover, steps 132 to 136 correspond to the correcting means of the sixth aspect of the present invention.

Film images recorded by photography under a typical light source such as daylight are essentially uncorrected by the above density and color correction conditions calculation processing. However, film images recorded by photography using an alternative light source have the alternative light source correction conditions set for each film image so that the previously set correction amount C of alternative light source correction is performed. The density and color conversion conditions (i.e. the gray balance correction conditions and the alternative light source correction conditions) set for each film image by the density and color conversion conditions calculation processing are output from the auto setup engine 44 to the image processor 40 which performs density and color conversion processing on the fine scan image data.

The image processing shown in the flow chart in FIG. 4 is carried out in the image processor 40 by performing a fine scan of each film image recorded on the photographic film 26 using the film scanner 12 and then inputting the fine scan image data to the image processor 40 of the image processing section 14. Note that, for reasons of convenience, the image processing carried out by the image processor is shown in FIG. 4 in a flow chart, however, in actual fact, the image processing is achieved using hardware such as an image processing circuit.

The image processor 40 firstly uses an LUT or the like to perform a pre-fine scan intermediate correction to correct the input fine scan image data so that the average density of the film image represented by the fine scan image data matches the average density of the film image represented by the prescan image data for the identical film image (step 210). Next, in step 212, the image processor 40 uses an LUT, a matrix calculation circuit (MTX) or the like to perform scanner calibration to correct any mechanical variation in the scanner 12 (for example, unevenness in each spectral sensitivity element of the linear CCD sensor 30).

Next, in step 214, the image processor 40 performs gray balance correction by inputting the fine scan image data, which has undergone pre-fine scan intermediate correction and scanner calibration, into the gray balance correction LUT in which are set gray balance correction conditions corresponding to the above data. Then, in step 216, alternative light source correction is performed by inputting the image data output from the gray balance correction LUT into an alternative light source correction LUT in which are set alternative light source correction conditions corresponding to the data.

Note that the gray balance correction in step 214 corresponds to the process of normalizing the fine scan image data using the normalizing means of the second aspect of the present invention. Note also that the alternative light source correction in step 216 corresponds to the color balance correction of the fine scan image data using the correcting means of the first and second aspects of the present invention.

As a result, bias in the color balance caused by the film characteristics and bias in the color balance caused by the light source present during the photography and recording are each corrected with a high level of accuracy. Moreover, when the film image being processed is one in which color failure or highlight failure is liable to occur, or even is an image recorded by photography using an alternative light source such as a fluorescent or tungsten light, the fine scan image data can be converted in such a way that the gray portions of the subject photographed (i.e. those portions which appear as gray when illuminated by a typical light source such as daylight) remain gray portions.

If the density and color correction processing (gray balance correction and alternative light source correction) are performed in the way described above, then, in step 218, the image processor 40 performs other image processings such as hypertone processing and hyper-sharpness processing. Consequently, image data which has undergone the above processings (output image data) may be output from the image processor 40 to the printer 16, for example, and used for recording the image on photographic printing paper 68. Alternatively, the image data may be stored on an information storage medium such as CD-R.

Note that, in the above description, the cosines COS of the hue angle differences were calculated and the hue angle correlation T determined for all the pixels in a film image, however, the present invention is not limited to this and the cosines COS of the hue angle differences may be calculated and the hue angle correlation T determined only for the candidate gray pixels from among all the pixels in a film image. Moreover, it is also possible to calculate the cosine COS of the hue angle difference only for those pixels which correspond to the non-highlight portions in a film image, and to calculate the cosine COS of the hue angle difference only for candidate gray pixels from among those pixels which correspond to the non-highlight portions in a film image.

Furthermore, in the above description, two readings of each film image have been performed—one at a relatively low resolution (the prescan) and one at a relatively high resolution (the fine scan). The low resolution image data obtained from the prescan has been used to set the density and color conversion conditions. However, the present invention is not limited to this, and the image data obtained from the prescan may be used only to set the reading conditions for the fine scan. Alternatively, it is also possible to perform only one single scanning of the film image at a resolution which corresponds to a fine scan. In this case, the density and color conversion conditions may be set by performing processes on the high resolution image data obtained from the fine scan such as thinning or integrating the pixels so as to generate low resolution image data, and then using the low resolution image data thus generated.

Furthermore, in the above description, a film image recorded on a photographic film by photography has been used as the original image, and scan image data obtained by reading the film image has been used as image data representing the original image. However, the present invention is not limited to this and images recorded by photography using a digital still camera (images represented by image data recorded on an information recording medium) may be used as the original images, and the image data recorded on the information recording medium using a digital still camera used as the image data representing the original image.

The embodiments of the present invention have been explained in detail above, however, the present embodiments may further include the embodiments described below.

(1) The image processing device according to the second aspect of the present invention in which, based on image data of a plurality of original images, the normalizing means extracts candidate gray pixels which have a high likelihood of being pixels corresponding to gray portions in a photograph subject from each original image, and then normalizes image data of the original image being processed based on a distribution on predetermined coordinates of a group of candidate gray pixels comprised of candidate gray pixels extracted from each original image.

(2) The image processing device according to (1) above in which the normalizing means determines high saturation pixels in the original image using the colors of the highlight and shadow in the original image as a reference, and extracts candidate gray pixels by the determined high saturation pixels.

(3) The image processing device according to (1) above in which the normalizing means estimates a gray axis which represents a gray balance of the film image being processed by performing linear approximation on the distribution within a density range of the original image being processed from among the distribution on predetermined coordinates of the group of candidate gray pixels, and then normalizes the image data of the original image being processed using the estimated gray axis as a reference.

What is claimed is:

1. An image processing device, comprising:
    calculating means for determining a color of a highlight portion in an original image, and a correlation between the color of the highlight portion in the original image and a color of each element forming the original image, based on image data representing the original image formed by photographing and recording an object;
    determining means for determining an extent of bias in a color balance of the original image caused by a light source at a time the object was recorded by photography, based on the color of the highlight portion in the original image, and the correlation between the color of the highlight portion in the original image and the color of each element forming the original image determined by the calculating means; and
    correcting means for correcting the color balance of image data in accordance with the color of the highlight portion, based on the extent of bias in the color balance of the original image caused by the light source determined by the determining means.

2. An image processing device comprising:
    normalizing means for estimating a gray balance in an original image to be processed, based on image data of a plurality of original images in which objects have been recorded by photography under uniform conditions, and normalizing the image data of the original image to be processed using the estimated gray balance as a reference;
    calculating means for determining a color of a highlight portion in an original image to be processed, and a correlation between the color of a highlight portion in the original image to be processed and a color of each element forming the original image to be processed, based on image data of the original image to be processed;
    determining means for determining a degree of the bias in a color balance of the original image to be processed caused by a light source at a time of photographing and recording an object, based on the color of the highlight portion in the original image to be processed, as well as the correlation between the color of the highlight portion in the original image to be processed and the color of each element forming the original image, which were determined by the calculating means; and
    correcting means for correcting the color balance of the image data of the original image to be processed in accordance with the color of the highlight portion, based on the degree of the bias in the color balance caused by the light source, determined by the determining means.

3. The image processing device according to claim 2, wherein the calculating means extracts the highlight portion of the original image to be processed using data of pixels other than high saturation pixels in the original image be processed determined using the colors of a highlight and shadow of the original image to be processed as references, based on image data before normalization has been performed by the normalizing means, determines the color of the extracted highlight portion, and determines, based on the image data of the original image to be processed after normalization has been performed by the normalizing means, the correlation between the highlight portion in the original image to be processed and the color of each element forming the original image.

4. The image processing device according to claim 2, wherein, as the elements forming the original image, the calculation means uses all pixels in the original image to be processed, or uses candidate gray pixels which have a high likelihood of being pixels corresponding to gray portions in a photographed object out of all of the pixels in the original image to be processed.

5. The image processing device according to claim 2, wherein, as the correlation between the color of the highlight portion and the color of each element forming the original image, the correcting means uses distribution of angles formed by highlight color vectors representing the color of the highlight portions and color vectors representing the color of each element forming the original image.

6. The image processing device according to claim 2, wherein the correcting means determines original images formed by photographing and recording similar scenes from among the plurality of original images, and corrects the color balance of image data of the original images formed by photograph and recording similar scenes by an identical or similar correction amount.

7. The image processing device according to claim 2, wherein, based on image data of a plurality of original images, the normalizing means extracts candidate gray pixels which have a high likelihood of being pixels corresponding to gray portions in a photographed object from each original image, and then normalizes image data of the original image being processed baed on a distribution on predetermined coordinates of a group of candidate gray pixels comprised of candidate gray pixels extracted from each original image.

8. The image processing device according to claim 7, wherein the normalizing means determines high saturation pixels in the original image using the colors of the highlight and shadow in the original image as a reference, and extracts candidate gray pixels by the determined high saturation pixels.

9. The image processing apparatus according to claim 7, wherein the normalizing means estimates a gray axis which represents the gray balance of the film image being processed by performing linear approximation on the distribution within a density range of the original image being processed from among the distribution on predetermined coordinates of the group of candidate gray pixels, and then normalizes the image data of the original image being processed using the estimated gray axis as a reference.

10. An image processing method comprising the steps of:
(a) estimating gray balance in an original image to be processed based on image data of a plurality of original images formed by photographing and recording an object under uniform conditions, and normalizing image data of the original image to be processed using the estimated gray balance as a reference;
(b) obtaining a color of a highlight portion in the original image to be processed, and a correlation between the color of the highlight portion in the original image to be processed and a color of each element forming the original image, based on image data of the original image to be processed;
(c) determining an extent of bias in a color balance of the original image to be processed caused by a light source present during photographing and recording of an object, based on the color of the highlight portion in the original image to be processed, and the correlation between the color of the highlight portion in the original image to be processed and the color of each element forming the original image; and
(d) correcting the color balance of image data of the original image to be processed in accordance with the color of the highlight portion, based on the extent of bias in the color balance caused by the light source.

11. The image processing method according to claim 10, wherein, in step (b), a highlight portion of the original image to be processed is extracted using data of pixels, other than high saturation pixels in the original image to be processed, determined using the color of the highlight and shadow of the original image to be processed as references, based on image data before step (a) has been performed, the color of the extracted highlight portion is determined, and, based on the image data of the original image to be processed after step (a) has been performed, the correlation between the highlight portion in the original image to be processed and the color of each element forming the original image is determined.

12. The image processing method according to claim 10, wherein, in step (b), the correlation between the color of the highlight portions and the color of each element is determined using, as the elements forming the original image, all pixels in the original image being processed or those candidate gray pixels having a high likelihood of being pixels which correspond to gray portions of a photographed object from among all pixels in the original image being processed.

13. The image processing method according to claim 10, wherein, in step (b), a distribution of angles formed by highlight color vectors representing colors of highlight portions and color vectors representing colors of each element forming an original image are used as the correlation between the color of the highlight portions and the color of each element forming the original image.

14. The image processing method according to claim 10, wherein, in step (d), original images in which similar scenes are recorded by photography are determined from among the plurality of original images, and the color balance of the image data of the original images in which similar scenes are recorded by photography is corrected by an approximately equal correction amount.

15. A recording medium on which is recorded a program for execution by a computer for processing of image data, the program comprising:
a first step in which gray balance of an original image to be processed is estimated based on image data of a plurality of original images formed by photographing and recording an object under uniform conditions, and image data of the original image to be processed is normalized using the estimated gray balance as a reference;
a second step in which a color of a highlight portion in the original image to be processed, and a correlation between the color of the highlight portion in the original image to be processed and a color of each element forming the original image is obtained based on image data of the original image to be processed;
a third step in which an extent of bias in a color balance of an original image to be processed caused by a light source present during the photographing and recording of the object is determined based on the color of the highlight portion in the original image to be processed, and the correlation between the color of a highlight portion in the original image to be processed and the color of each element forming the original image; and
a fourth step in which the color balance of image data of the original image to be processed is corrected in accordance with the color of the highlight portion based on the above-determined extent of bias in the color balance caused by the light source.

16. An image processing device, comprising:
a color determining unit configured to determine correlations between colors of a highlight portion of an image and colors of elements forming the image;
a bias determining unit configured to determine a degree of bias in a color balance of the image caused by a source light based on the colors of the highlight portion and the correlations determined by the color determining unit; and
a color correcting unit configured to correct the color balance of the image based on the degree of bias determined by the bias determining unit.

17. The device of claim 16, wherein the correlations are determined for one of:
elements corresponding to non-highlight portions of the image; and
elements corresponding to an entirety of the image.

18. The device of claim 16, wherein the color correcting unit is configured to correct the color balance of the image in accordance with the color of the highlight portion.

19. The device of claim 16, further comprising:
a gray balance estimating unit configured to estimate a gray balance of an image based on image data of a plurality of original images.

20. The device of claim 19, wherein the plurality of original images are images recorded under substantially uniform confitions.

* * * * *